United States Patent [19]

Nagayama et al.

[11] Patent Number: 4,707,260
[45] Date of Patent: Nov. 17, 1987

[54] SOLID LIQUID SEPARATION DEVICE

[75] Inventors: Takashi Nagayama, Kusatsu; Mitsunobu Otani, Otsu; Tamotsu Date, Shiga, all of Japan

[73] Assignee: Toray Industries, Inc., Tokyo, Japan

[21] Appl. No.: 860,193

[22] PCT Filed: Aug. 27, 1984

[86] PCT No.: PCT/JP84/00410
§ 371 Date: Apr. 25, 1986
§ 102(e) Date: Apr. 25, 1986

[87] PCT Pub. No.: WO86/01429
PCT Pub. Date: Mar. 13, 1986

[51] Int. Cl.$^4$ .............................................. B01D 33/04
[52] U.S. Cl. ................................... 210/386; 100/118; 100/121; 100/151; 210/402
[58] Field of Search ............... 210/386, 350, 541, 542, 210/400, 401, 416.1, 160; 100/104, 118–121, 151–154; 162/305, 287, 396, 348, 363, 373

[56] References Cited
FOREIGN PATENT DOCUMENTS
83862 7/1975 Japan.

Primary Examiner—Frank Sever
Attorney, Agent, or Firm—Birch, Stewart, Kolasch, & Birch

[57] ABSTRACT

The device according to the present invention comprises a unidirectionally circulating endless filter cloth with a napped filter layer on the surface, a solid-liquid mixture supply device installed on the front side of filter cloth, a depressurizing suction device installed on the backside of the filter cloth, a non-filterable content withdrawing device installed downstream of the solid-liquid mixture supply device and the depressurizing suction device, and a filter cloth wash device installed downstream of the non-filterable content withdrawing device in the running direction of the filter cloth and located between the non-filterable content withdrawing device and the solid-liquid mixture supply device or the depressurizing suction device. The depressurizing suction device is equipped with a depressurized suction port splaying in the running direction of said filter cloth. The depressurized suction port is equipped with at least one group of filter cloth guide rolls on the right and left sides in the running direction of filter cloth. The filter cloth guide rolls which constitute the right of left group spread outwardly in the running direction of filter cloth. The present device can minimize damage to the filter cloth by the depressurizing suction device without decreasing the solid-liquid separation performance and thus drastically prolong the service life of the filter cloth.

50 Claims, 27 Drawing Figures

SOLID LIQUID SEPARATION DEVICE

BACKGROUND OF THE INVENTION

Field of the Invention

The present invention relates to a solid-liquid separation device, and more specifically to a solid-liquid separation device such as a filter or filter press of the traveling filter cloth type.

Recently a filter cloth which is made of a textile material with short fibers slanting in one direction piled on its surface or a napped filter cloth with a napped filter layer has been developed (Japanese Patent Publication Nos. SHO 58-207917, 59-115720).

These developments have been followed by a development of filters or filter presses of the so-called traveling filter cloth type (collectively- called solid-liquid separation devices hereinafter) which include a piled filter cloth or a napped filter cloth endlessly moving in one direction on a predetermined path so that a solid-liquid mixture is supplied on the filter cloth and the solid content and the liquid content of the mixture are separated. These solid-liquid separation devices are designed such that a depressurizing suction means is provided on the backside of the filter cloth in opposition to the solid-liquid mixture supply means to suck the liquid content of the solid-liquid mixture supplied on, the filter cloth, thereby promoting the passing of the liquid content and enhancing the efficiency of solid-liquid separation. Such a depressurizing suction means is maintained at such a high vacuum e.g., over 500 mm water column, so that the filter cloth is pulled by the large sucking force.

In the conventional solid-liquid separation device, a depressurizing suction means with a square suction port of constant width is installed in the traveling direction of the filter cloth and a plurality of filter cloth guide rolls of constant length corresponding to the width of the suction port are arranged parallel to one another at the suction port for the purposes of preventing the filter cloth from being deflected by the sucking force. However, the conventional solid-liquid separation device of such a design has the drawbacks mentioned below.

Since filter cloth guide rolls of the constant length are provided to match the shape of the suction port of constant width, every roll end engages with the same area of the filter cloth. Since the suction port is a square of constant width, the side wall of the suction port will linearly abrade the same area of the filter cloth. Thus as a result of being subjected to a large sucking forces and linearly abraded against roll ends and the side wall of the suction port, that area of filter cloth becomes linearly abraded, and in the worst case, becomes torn. The damaged filter cloth will decrease the efficiency of, its solid-liquid separation and will even fail to maintain the depressurized state of the depressing area, whereby its treating ability will be greatly impaired.

It is conceivable to reinforce a particular area of filter cloth with a different material having superior anti-wear characteristics, because it is always one particular area that abrades against the roll ends and the suction port wall. However, passage of the liquid content will be hindered at the reinforced area, thereby decreasing the treating ability of the filter cloth.

SUMMARY OF THE INVENTION

An object of the present invention is to provide a solid-liquid separation device free from the above-mentioned drawbacks, which can significantly prolong the service life of the filter cloth without reducing the solid-liquid separation performance and the treating ability of the filter cloth, because damage to the filter cloth at the depressurized suction area is minimized.

(C-1): A solid-liquid separation device comprising: a unidirectionally circulating endless filter cloth having a napped filter layer on its front surface; a solid-liquid mixture supply means provided on the front side of the filter cloth; a depressurizing suction means provided on the backside of said filter cloth in opposition to the solid-liquid mixture suply means; a non-filterable content withdrawing means provided downstream of the solid-liquid mixture supply means and the depressurizing suction means in the circulating direction of the filter cloth; and a filter cloth wash means provided downstream of the non-filterable content withdrawing means in the running direction of the filter cloth and located midway between the non-filterable content withdrawing means and the solid-liquid mixture supplying means or the depressurizing suction means, the depressurizing suction means being a depressurized suction port facing the back surface of the filter cloth and splaying in the running direction of the filter cloth, the depressurized suction port having at least one group of filter cloth guide rolls on each right and left side of the running direction of the coating, and the filter cloth guide rolls in each right and left group of the filter cloth guide rolls inclining outward in the running direction of the filter cloth.

Desirable variations of the above-mentioned device are as follows:

(C-2): The device of (C-1) in which the splay angle of the depressurized suction port is in the range of 0.5–5 degrees.

(C-3): The device of (C-1) in which both outside edge portions of the right and left groups of filter cloth guide rolls are not covered with a guide sheet.

(C-4): The device of (C-3) in which the groups of filter cloth guide rolls consist of a central group, a right group and a left group.

(C-5): The device of (C-4) in which the roll length of the filter cloth guide rolls in the central group increases gradually in the running direction of the filter cloth, while the roll length of the filter cloth guide rolls in the right and left groups remains constant in the running direction of the filter cloth.

(C-6): The device of (C-4) in which the roll length of filter cloth guide rolls in the central group remains constant in the running direction of the filter cloth, while the roll length of the filter cloth guide rolls in the right and left groups increases gradually in the running direction of the filter cloth.

(C-7): The device of (C-3) in which the groups of filter cloth guide rolls consist of a right group and a left group.

(C-8): The device of (C-7) in which the roll length of the filter cloth guide rolls in the right and left groups increases gradually in the running direction of the filter cloth.

(C-9): The device of (C-7) in which the roll length of the filter cloth guide rolls in the right and left groups remains constant in the running direction of the filter cloth, and the spacing of the right and left groups of filter cloth guide rolls becomes gradually wider in the running direction of the filter cloth.

(C-10): The device of (C-1) in which both outside edge portions of the filter cloth guide rolls in the right and left groups are covered with a guide sheet and the inside edges of the sheet form both edges of the depressurized suction port.

(C-11): The device of (C-10) in which the groups of filter cloth guide rolls consist of a central group, a right group and a left group.

(C-12): The device of (C-11) in which the roll length of the filter cloth guide rolls in the central group and the roll length of the filter cloth guide rolls in the right and left groups remain respectively constant in the running direction of the filter cloth.

(C-13): The device of (C-11) in which the roll length of the filter cloth guide rolls in the central group increases gradually in the running direction of the filter cloth, while the roll length of the filter cloth guide rolls in the right and left groups remains constant in the running direction of the filter cloth.

(C-14): The device of (C-11) in which the roll length of the filter cloth guide rolls in the central group remains constant in the running direction of the filter cloth, while the roll length of the filter cloth guide rolls in the right and left groups increases gradually in the running direction of the filter cloth.

(C-15): The device of (C-10) in which the groups of filter cloth guide rolls consist of a right group and a left group.

(C-16) The device of (C-15) in which the roll length of the filter cloth guide rolls in the right and left groups remains constant in the running direction of the filter cloth.

(C-17): The device of (C-15) in which the roll length of the filter cloth guide rolls in the right and left groups increases gradually in the running direction of the filter cloth.

(C-18): The device of (C-15) in which the roll length of the filter cloth guide rolls in the right and left groups remains constant in the running direction of the filter cloth and the spacing of the right and left groups of filter cloth guide rolls becomes gradually wider in the running direction of the filter cloth.

In the devices of (C-1) to (C-18), the roll end abrades against the filter cloth with a width matching the splayed degree. Thus unlike in the conventional device, there occurs no linear abrasion of the same area of filter cloth. Accordingly damage to the filter cloth can be prevented. As a result, not only can the service life of the filter cloth be largely extended but also a high level of solid-liquid separation performance and treating ability of the filter cloth can be maintained for a long period of time. Since the suction port is designed to splay, there is little possibility of the filter cloth being damaged through linear abrasion against the port edge. Meanwhile, since the filter cloth guide roll inclines outward in the circulating direction of filter cloth, the filter cloth can run with stability being expanded in the width direction.

(C-19): The device of (C-1) in which the depressurizing suction means is a tank equipped with a suction pipe and a liquid-content discharge pipe, the suction pipe and the liquid-content discharge pipe being connected to each other through a pressure-equalizing pipe.

The constitution of (C-19) prevents an air-lock phenomenon in the liquid discharge pipe and assures stable treating ability and stable performance of solid-liquid separation of the filter cloth, by making the discharge of the liquid content through the filter cloth smooth.

(C-20): The device of (C-1) in which the filter cloth guide roll is made of a perforated roll or a grooved roll.

(C-21): The device of (C-1) in which the right and left groups of filter cloth guide rolls consist of a group of perforated rolls and a group of non-perforated rolls, the perforated roll group being located upstream of in the running direction of the filter cloth.

In the constitutions of (C-20) and (C-21), a perforation or a groove makes a suction path and accordingly the actual open area at the depressurized suction port is not reduced. Thus a large suction effect can be secured at low power cost with a stable movement of filter cloth, thereby saving the running cost. Moreover, the filter cloth guide rolls can be densely spaced practically without decreasing the open area and not only a stable running of the filter cloth with little damage to the filter cloth is guaranteed, but also the running cost can be saved with little driving power needed for running. Furthermore, an increased suction effect permits the depressurized suction port to be designed short, and accordingly with the number of filter cloth guide rolls cut down, damage to the filter cloth through its contact with the roll can be suppressed. Furthermore, a stabilized guiding of filter cloth permits the degree of depressurization at the depressurized suction port to be increased, thereby enhancing the efficiency of solid-liquid separation.

(C-22): The device of (C-1) in which the filter cloth guide rolls are supported on a mount frame installed at the depressurized suction port, and the filter cloth guide rolls opposed to each other in the right and left groups are spacedly supported on a common shaft, both ends of the shaft being engaged and held at non-open holes provided in the mount frame, and the mid-part between the right and left filter cloth guide rolls being engaged and held at open holes provided on the mount frame.

According to (C-22), the filter cloth guide rolls can be supported and at the same time can be easily taken off with no need of dismantling the mount frame for inspection, repair or replacement. Since the supporting of filter cloth at both ends of the shaft where filter cloth is liable to abrasion is done at the non-open holes instead of the open holes, there is no likelihood of the notched edge scratching the running filter cloth, thereby preventing damage to the filter cloth. In between the rolls, the shaft engages the open holes provided in the mount frame. Since the filter cloth guide rolls face outward in the circulating direction of filter cloth, the running filter cloth is stretched in the width direction with virtually no deflection of the central portion in the width direction, hence with no possibility of the filter cloth being caught in the open holes.

(C-23): The device of (C-1) in which the solid-liquid mixture supply means comprises: a solid-liquid mixture level adjust tank having an overflow weir to supply the solid-liquid mixture and an overflow weir to discharge the solid-liquid mixture, which is higher than the overflow weir for the solid-liquid mixture supply; a solid-liquid mixture discharge means connected to the solid-liquid mixture level adjust tank on the side of the overflow weir for solid-liquid mixture discharge; and a solid-liquid mixture intake means installed opposite the solid-liquid mixture level adjust tank.

The constitution of (C-23) makes it possible to discharge an excess supply of solid-liquid mixture generated on account of a deterioration in the filter cloth performance or of a change in the properties of the solid-liquid mixture, thereby preventing the excess supply from making the device dirty.

Moreover according to (C-23), there is no need for monitoring the operating for functional deterioration of filter cloth or for property change in the solid-liquid mixture. Thus a stable running condition can be secured over a long period and a non-man operation can be realized.

(C-24): The device of (C-1) in which the filter cloth wash means is a water spray nozzle (front surface wash nozzle) installed opposite to the surface of the filter cloth.

(C-25): The device of (C-24) in which a filter cloth hold member is installed at a position opposed to the water spray nozzle (front surface wash nozzle) on the backside of the filter cloth.

According to (C-25), the filter cloth wash effect is extremely high, hence the treating ability and the solid liquid separation efficiency are equally high. Presence of the filter cloth hold member yields a great washing effect, because the relative position between filter cloth and water spray nozzle (front surface wash nozzle) can be stabilized without any heavy deflection or distortion of the filter cloth, even when pressurized washing water is ejected against the filter cloth by the water spray nozzle (front surface wash nozzle). Since the filter cloth can be thoroughly flushed with no clogging, subsequent solid-liquid separation can be efficiently done.

(C-26): The device of (C-24) in which the water spray nozzle (front surface wash nozzle) comprises a water intake pipe extending in the width direction of the filter cloth, a plurality of nozzle elements fitted in rows to said water intake pipe, and a filter cloth guide member attached to the water intake pipe and protruding beyond the nozzle elements.

According to (C-26), deflection, distortion or vibration of filter cloth due to the pressure of washing water can be prevented. Thus a definite positional relationship between filter cloth and water spray nozzle (front surface wash nozzle) can be maintained all the time, thereby assuring a very high washing effect and an equally high efficiency of solid-liquid separation. An increased pressure of the washing water additionally contributes to enhancement of solid-liquid separation efficiency. Besides, the presence of the filter cloth guide prevents the water spray nozzle (front surface wash nozzle) from catching a running filter cloth in a disturbed state, thereby protecting the filter cloth from damage.

(C-27): The device of (C-1) in which the wash means consists of a water spray nozzle (back-wash nozzle) installed opposite to the backside of filter cloth.

(C-28): The device of (C-27) in which a comb means is installed on the front side of filter cloth upstream of the water spray nozzle (back-wash nozzle) in the running direction of the filter cloth.

According to (C-28), the comb means can rectify, and then wash, the naps ruffled or entangled in the process of solid-liquid separation, whereby the washing water can penetrate easily to remove even the solids embedded deep in the filter layer with reliability. Thus with high efficiency of solid-liquid separation and uniform washing effect maintained all the time, the operating condition can be stabilized.

(C-29): The device of (C-27) in which a depressurizing suction tank is installed on the front side of the filter cloth at a position opposed to the water spray nozzle (back-wash nozzle).

According to (C-29), the filter cloth washing effect is extremely high with practically no clogging and a high efficiency of solid-liquid separation, because the depressurizing suction tank serves to help penetration of the washing water through the filter cloth and the washing water serves to rectify the disturbed naps.

(C-30): The device of (C-27) in which a back-wash water receive tank and an excess water receive tank are installed respectively below the water spray nozzle (back-wash nozzle) and the filter cloth, the excess water receive tank being located below both edges of the filter cloth.

According to (C-30), the washing water can be reclaimed in such a state that the waste water into a relatively clean excess water flowing out at both edges of filter cloth is separated from a back-wash water relatively rich in solids and containing the cloggings of filter cloth. Thus the volume of the washing water to be retreated can be decreased, thereby reducing the running cost.

(C-31): The device of (C-1) in which the filter cloth wash means comprises: a pair of filter cloth control rolls installed downstream of the non-filterable content withdrawing means in the running direction of the filter cloth and between the non-filterable content withdrawing means and the solid-liquid mixture supply means; a water spray nozzle (back-wash nozzle) installed upstream of the solid-liquid mixture supply means and downstream of the filter cloth control rolls in the running direction of the filter cloth on the back side of the filter cloth; and a pair of filter cloth hold members spacedly installed on the front side of the filter cloth and spaced from each other at positions opposed to the water spray nozzle (back-wash nozzle), the filter cloth being bent in a S-letter curve by the pair of filter cloth control rolls and the filter cloth forming an up-gradient between the pair of filter cloth control rolls and the water spray nozzle (back-wash nozzle) or the filter cloth hold members.

According to (C-31) a definite positional relationship between the water spray nozzle (back-wash nozzle) and filter cloth can be maintained with no possibility of the filter cloth being irregularly defected, distorted or vibrated even when the pressure of the washing water is increased considerably to improve the washing effect. Thus a high washing effect is gained. Meanwhile, the water absorbed by the filter cloth can be reduced, because, with the water spray nozzle (back-wash nozzle) located at an upgradient of filter cloth and the pair of filter cloth control rolls located upstream of the nozzle thereby forming an S-letter bend of filter cloth, that is, a so-called valley of filter cloth, excess water remaining on the backside of the filter cloth can be discharged at the area of the filter cloth control rolls. For these reasons, the solid-liquid separation efficiency of the device can be enhanced.

(C-32): The device of (C-1) in which a comb means is installed in contact with the surface of the filter cloth, downstream of the filter cloth wash means in the running direction of the filter cloth and between the filter cloth wash means and the solid-liquid mixture supply means.

According to (C-32), naps disturbed by washing can be rectified and a decline in the arresting rate of solids or an instability of solid-liquid separation efficiency due to a disturbed filter layer can be avoided.

(C-33): The device of (C-1) in which a water spray nozzle is installed on the front side of the filter cloth downstream of the solid-liquid mixture supply means in the running direction of the filter cloth and at a position opposed to the depressurizing suction means.

According to (C-33), it is possible to spray water onto the non-filterable content on the filter cloth, dilute the liquid content and thereby promote separation of the liquid content and also to wash out a content adhering to the solids or caught between the solids. This implies also that the solids obtained have an increased purity.

(C-34): The device of (C-1) in which the non-filterable content withdrawing means comprises a transfer drum installed on the front side of the filter cloth, at least one compression roll installed on the backside of filter cloth in opposition to the transfer drum, and a scraper installed in opposition to the transfer drum.

(C-35): The device of (C-34) in which the scraper can freely come into or out of contact with the surface of the transfer drum.

According to (C-34) and (C-35), the scraper to remove the filter cake, which can freely come into or out of contact with the surface of the transfer drum, is normally set off from the surface of the transfer instead of being fixed in contact with the surface of the transfer drum. The scraper is activated to scrape off the cake, whenever a layer or layers of cake are formed on the surface of the transfer drum. As the thickness of the cake increases, an increased compressive force is applied on the cake by the compression roll and with a rotation of the transfer drum, the compression is repeated a number of times. Therefore a cake with the least liquid content can be obtained without increasing the number of compression rolls or increasing the compressive force. Besides, even when the compressive force is increased to match an increased thickness of the cake, the increased force acts mainly on the already compressed cake and accordingly any extrusion of the solid-liquid mixture beyond the edges of filter cloth can be prevented, at the same time raising the solids recovery rate. Moreover, a filter cake with the least liquid content can be obtained and therefore a cost of a post-treating such as burning can be saved.

(C-36): The device (C-34) in which a cake discharge means is installed below the scraper.

According to (C-36), the filter cake scraped off the transfer drum can be discharged out of the device without leaving the cake on the filter cloth. Thus there is no possibility of the cake being scraped off onto the filter cloth causing a drop in the cake recovery rate.

(C-37): The device of (C-34) in which the compression roll is provided with a means to urge the compression roll toward the transfer drum.

(C-38): The device of (C-34) in which a dewatering means is installed upstream of the compression rolls in the running direction of the filter cloth and in contact with or in proximity to the compression roll.

According to (C-38), the extracted liquid content dropping onto the compression rolls and collecting in between the compression rolls and filter cloth will never be moved back onto the filter cloth or adsorbed by the cake on the filter cloth, as the compression rolls rotate.

(C-39): The device of (C-34) in which an air blast nozzle is installed downstream of the transfer drum and upstream of the filter cloth wash means, in the running direction of the filter cloth in opposition to the surface of the filter cloth.

According to (C-39), even when a filter cake scraped off the transfer drum happens to drop and adhere again to the filter cloth, the cake can be removed and discharged out of the device. Therefore with no possibility of a re-adhering cake being carried onto the succeeding filter cloth wash means or the solid-liquid mixture supply means, the solids can be efficiently recovered.

(C-40): The device of (C-1) in which the non-filterable content withdrawing means comprises a water spray nozzle (collecting nozzle) installed in opposition to the surface of the filter cloth.

According to (C-40), the construction of the device can be extremely simplified and the cost of the device is low. For instance, there is no need to provide a compression roll or a transfer drum to compress the non-filterable content on the filter cloth and scrape it off after transferring. Simply the water spray nozzle (collecting nozzle) has only to be installed in opposition to the filter cloth. Meanwhile the liquid ejected from the water spray nozzle (collecting nozzle) contributes to some extent to the washing of the filter cloth and correspondingly the running cost can be saved.

(C-41): The device of (C-40) in which a collected content receive tank is installed below the water spray nozzle (collecting nozzle) and a collected content-circulating pipe connects the water spray nozzle to the collected content receive tank.

According to (C-41), there is no fear of the non-filterable content withdrawn from the surface of filter cloth being diluted. Besides, the collecting rate can be further enhanced, when the water spray nozzles (collecting nozzle) are provided in multi-stages and the receive tank is divided into a number of compartments each corresponding to each water spray nozzle.

(C-42): The device of (C-41) in which the collected content receive tank and the water spray nozzle (collecting nozzle) are connected with each other via a water tank equipped with a defoaming means.

According to (C-42), the foam is eliminated by the defoaming means, and there is no likelihood that the foam overflowing the water tank pollutes the environment, or that the collected content-circulating pump develops a problem due to the entrainment of foams into the circulating pipe, or that the solids adhering to the foam surface coagulate into flocks and the flocks clog the circulating pipe and water spray nozzle (collecting nozzle).

(C-43): A solid-liquid separation device comprising: a unidirectionally circulating endless filter cloth with a napped filter layer on the surface; a solid-liquid mixture supply means installed on the front side of the filter cloth; a depressurizing suction means installed on the backside of the filter cloth, in opposition to the solid-liquid mixture supply means; a non-filterable content withdrawing water spray nozzle installed downstream of the solid-liquid mixture supply means and the depressurizing suction means in the running direction of the filter cloth, in opposition to the surface of the filter cloth; and a filter cloth wash means installed downstream of the non-filterable content withdrawing water spray nozzle in the running direction of the filter cloth, between the non-filterable content withdrawing water spray nozzle and the solid-liquid mixture supply means or the depressurizing suction means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DETAILED DESCRIPTION OF PREFERRED EMBODIMENTS

Figure 1:
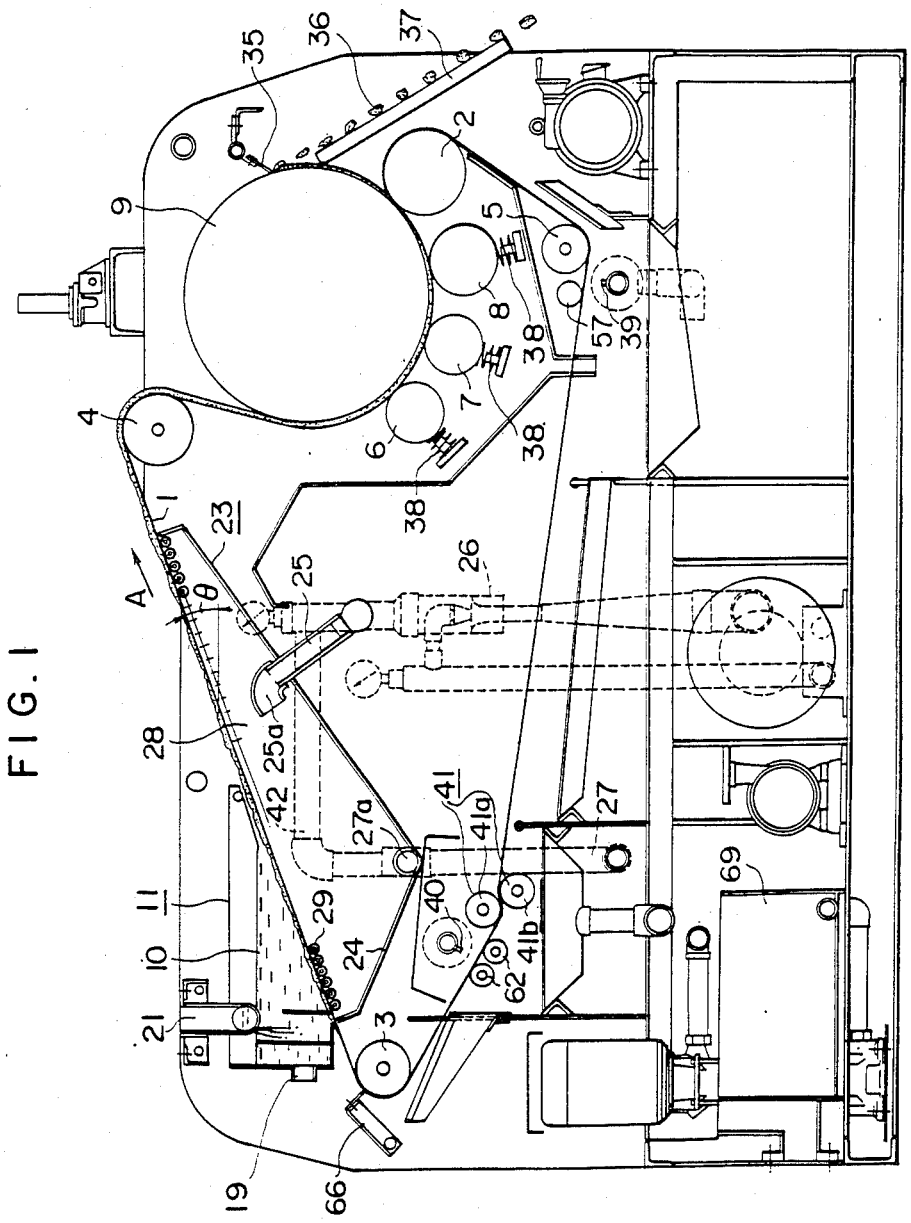
FIG. 1 is a schematic side view of a transfer dewatering device of a traveling filter cloth type according to one embodiment of the solid-liquid separation device of the present invention.
Figure 2:
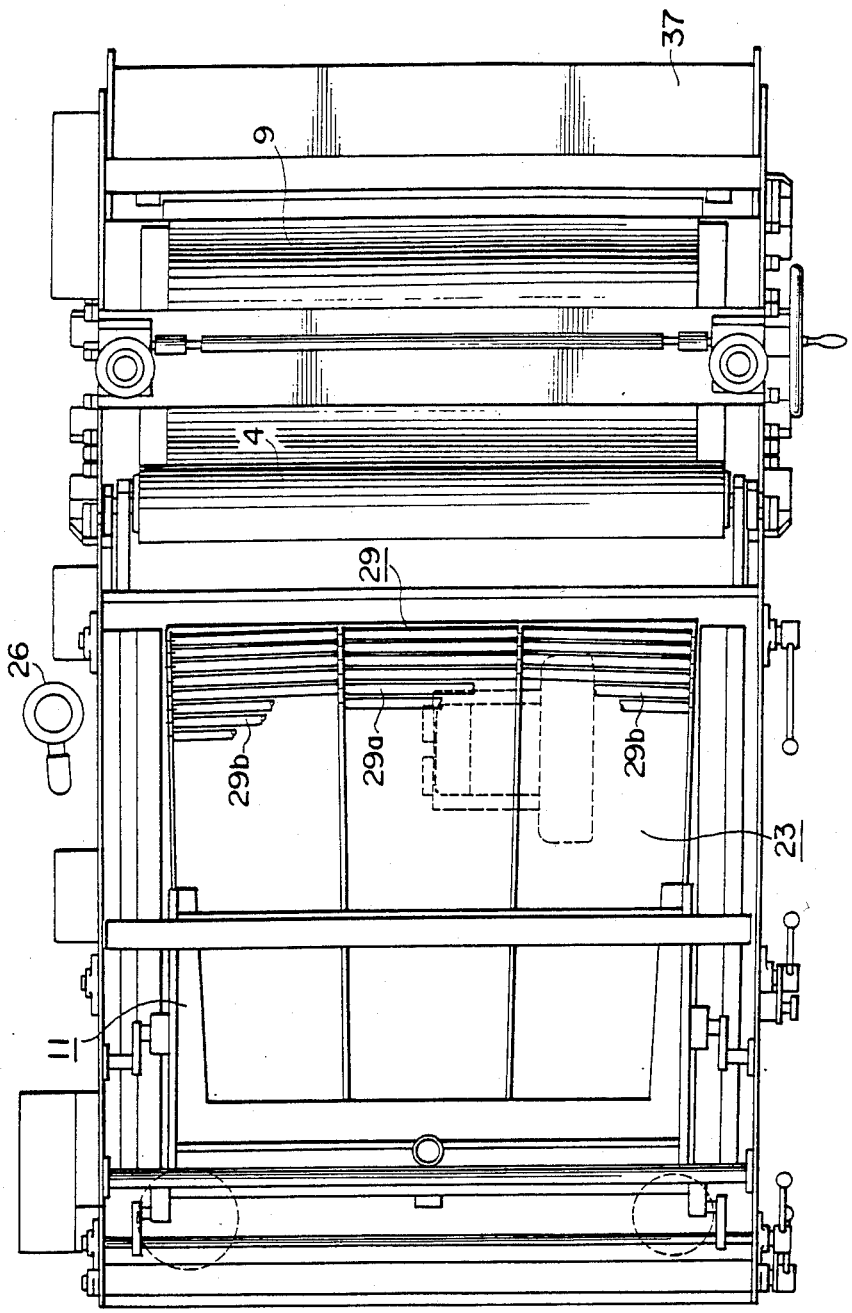
FIG. 2 is a plan view of the transfer dewatering device in FIG. 1.

One embodiment of the solid-liquid separation device according to the present invention will be described. FIG. 1 is a schematic side view with a partial section of a so-called filter cloth travelling type transfer dewatering device. FIG. 2 is a plan view of the device in FIG. 1.

In FIGS. 1 and 2, reference numeral 1 shows an endless filter cloth.

The endless filter cloth 1 is stretched in tension between a drive roll 2 and three guide rolls 3, 4, and 5 to circulate in the direction of arrow A on a fixed path regulated by the drive roll 2, the guide rolls 3, 4, 5, compression rolls 6, 7, 8, and a transfer drum 9. The filter cloth 1 is stretched in tension with a slightly upward angle $\theta$ to the horizontal plane from the guide roll 3 to the guide roll 4. The angle $\theta$ is desirably set in the range of 5°–20° so that the depth of the mixture on the solid-liquid mixture supply means 11 can be as small as possible and that the contact area between the mixture 10 and the filter cloth 1 can be as large as possible.

Figure 4:
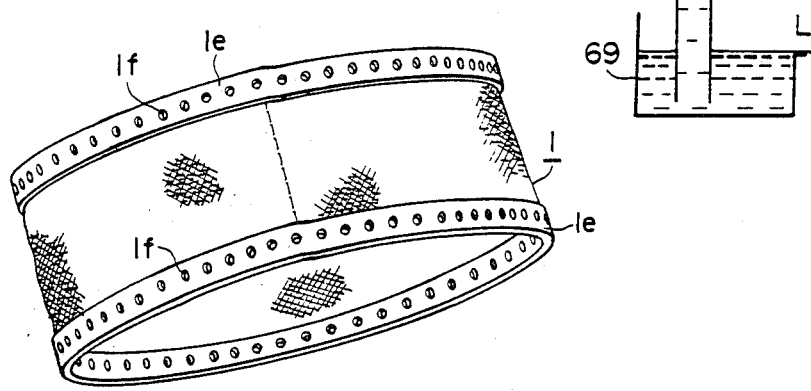
FIG. 4 is an oblique view of the filter cloth.
Figure 5:
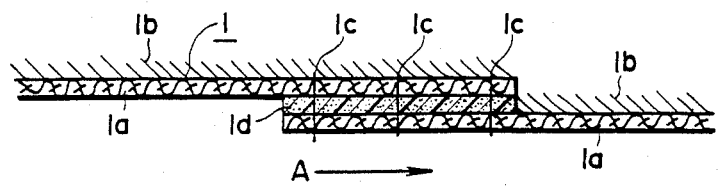
FIG. 5 is a sectional view showing a junction of filter cloth.

The filter cloth 1 is desirably constituted such as disclosed, for instance, in Japanese Patent Publication No. SHO 58-207917 or Japanese Patent Publication SHO No. 59-115720. Namely, as indicated in FIGS. 4 and 5, a knit or woven material using a synthetic fiber multi-filament (including a spun yarn) of 0.1–10 microns in diameter of a single filament is desirably taken as the base material 1a. The surface of the base material 1a is circumferentially raised to create naps 1b each of which naps has the diameter of 0.1–10 microns and these naps constitute a filter layer. In such a filter cloth 1 raised circumferentially, the naps 1b lie in a specified direction, that is, they are directional. For use, the filter cloth 1 is stretched in tension with the direction of the naps 1b opposed to the running direction A of the filter cloth 1. The filter cloth 1 is made endless using the sewing yarn 1c and the adhesive 1d. At both edges in the length direction of the filter cloth 1 extend the belts 1e, 1e, whose holes 1f, 1f engage the teeth provided on the guide roll 3, thereby preventing the feed of the filter cloth 1 from deviating in the width direction or in the running direction.

Figure 6:
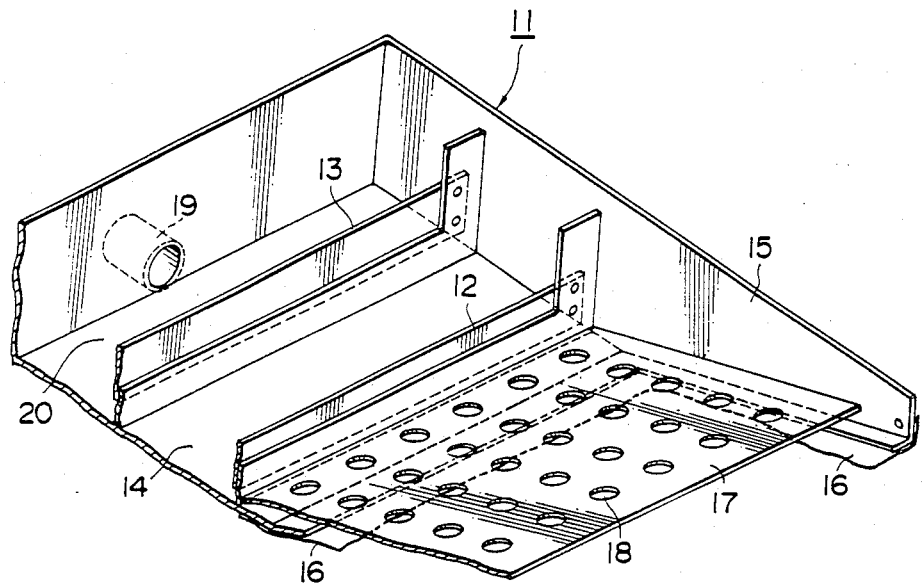
FIG. 6 is a partial oblique view of the solid-liquid mixture supply means.
Figure 7:
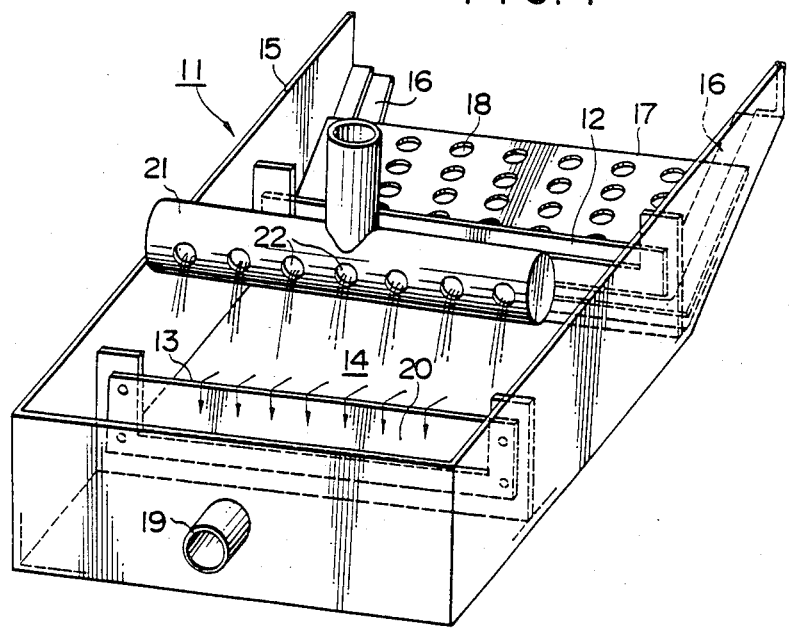
FIG. 7 is an oblique view of the solid-liquid mixture supply means.

As indicated in FIGS. 6 and 7, the solid-liquid mixture supply means 11 is equipped with a solid-liquid mixture level adjust tank 14 having an overflow weir 12 for the solid-liquid mixture supply and an overflow weir 13 for the solid-liquid mixture discharge. Depending on the nature of the filter cloth 1 or of the solid-liquid mixture 10, the height of these overflow weirs 12, 13 may be arbitrarily changed, but it should be adjusted such that the overflow weir 13 is invariably higher than the overflow weir 12.

Part of the solid-liquid mixture level adjust tank 14 on the side of the overflow weir 12 is formed as a solid-liquid mixture supply frame 15. The frame 15 has its bottom edge bent inside, but has its bottom open. The bottom edge is attached with a sealing piece 16 of synthetic resin sheet such as vinyl chloride or of cloth, so that the bottom edge may not directly touch the filter cloth 1 or that the solid-liquid mixture 10 may not go beyond the frame 15. Further, the frame 15 is attached with a streamlining plate 17 approximately parallel to the filter cloth 1 at about 0.5–50 mm from the bottom position. The streamlining plate 17 is made of a metal plate of stainless steel or aluminum or a synthetic resin plate of vinyl chloride perforated with numerous stream lining holes 18. Part of the solid-liquid mixture level adjust tank on the side of the overflow weir 13 is formed as a solid-liquid discharge tank 20 equipped with a solid-liquid mixture discharge pipe 19, the pipe 19 and the tank 20 constituting the solid-liquid mixture discharge means.

Above the solid-liquid mixture level adjust tank 14 is located a solid-liquid mixture intake pipe 21, which is the solid-liquid mixture intake means indicated in FIG. 7. The intake pipe 21 is made of an inverted-T pipe bored with numerous intake holes 22. The intake pipe 21 is so set as to face the overflow weir 13.

In FIGS. 1 and 2, on the backside of the filter cloth 1 there is installed a depressurizing suction means 23 at a position opposed to the solid-liquid mixture supply means 11. The depressurizing suction means 23 is equipped with a filtrate hold tank 24, which is connected to a suction means 26 via a suction pipe 25 having a suction port 25a. The means 23 maintains the backside of the filter cloth 1 at a depressurized state of over 500 mm water column. The filtrate hold tank 24 is equipped with a discharge pipe 27 having a filtrate discharge port 27a. The top of the tank 24 is open to constitute a depressurized suction port 28, at which a plurality of filter cloth guide rolls 29 are arranged.

Figure 3:
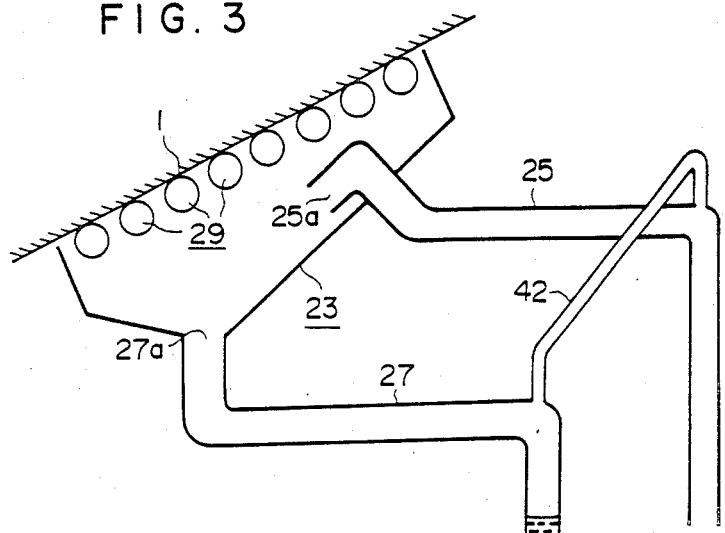
FIG. 3 is a schematic longitudinal view of the area of a pressure equalizing pipe.

The suction port 25a of the suction pipe 25 opens at a higher level than the discharge port 27a of the discharge pipe 27 so that the filtrate does not enter the suction pipe 25. The suction pipe 25 and the discharge pipe 27, as indicated in FIG. 3, have a horizontal portion removed from the endless filter cloth 1. The horizontal portion of the suction pipe 25 is set higher than that of the discharge pipe 27. Where the horizontal portions end, the two pipes 25 and 27 are mutually connected by a pressure equalizing pipe 42. The end of the discharge pipe 27 enters sealing pot 69 so that the depressurization by the depressurizing suction means 23 can be water-sealed.

Figure 8:
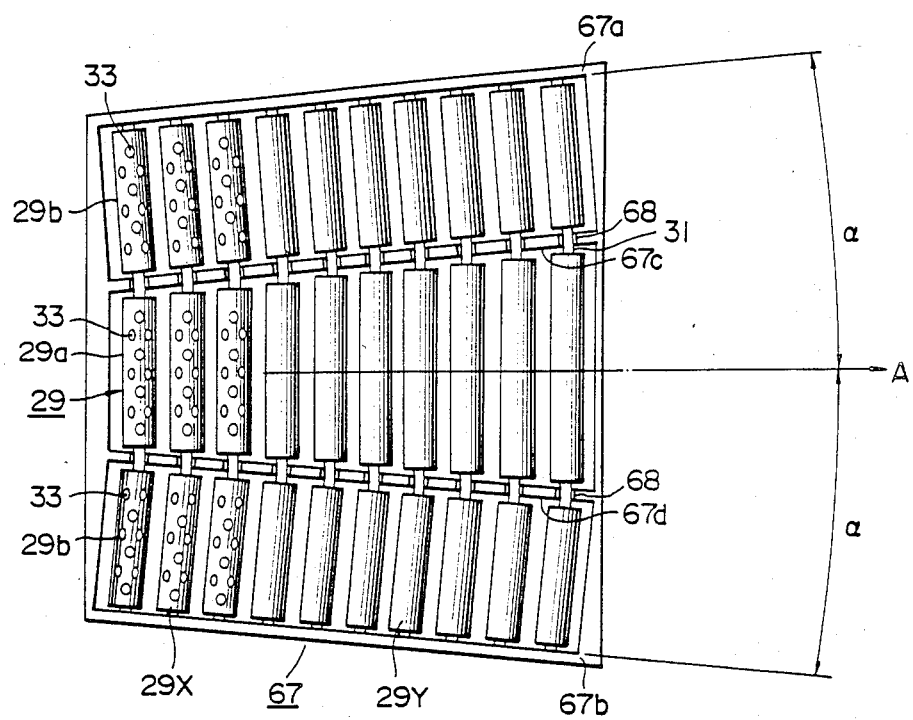
FIG. 8 is a plan view of the depressurizing suction means.
Figure 10:
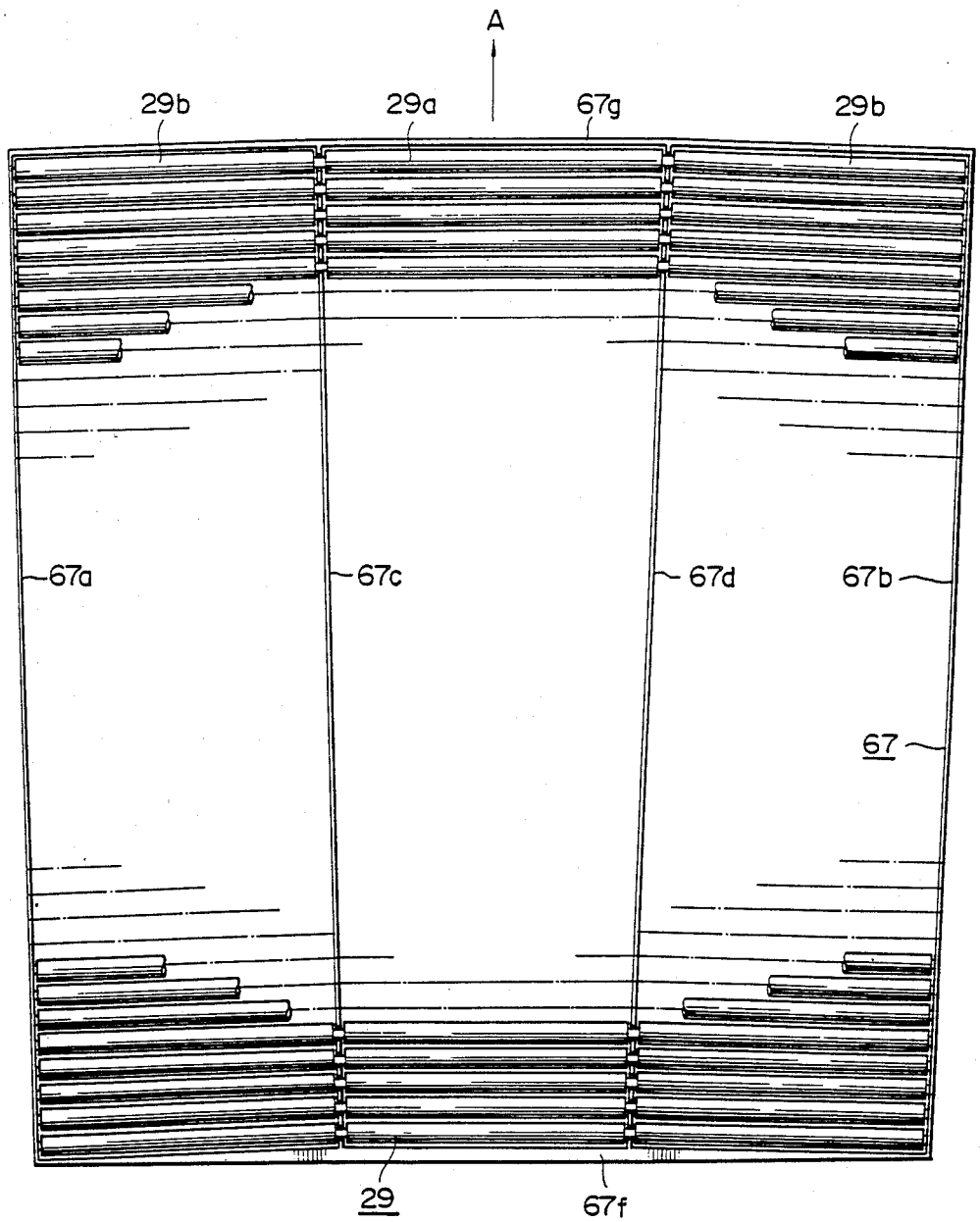
FIGS. 10 to 19 are plan views showing different arrangements of the depressurized suction port and the filter cloth guide roll in different embodiments of the present invention.

As indicated in FIGS. 1, 2, 8 and 10, the depressurized suction port 28 of the filtrate hold tank 24 is designed to splay in the running direction A of the filter cloth 1. And at the depressurized suction port 28 is attached a mount frame 67 of the same configuration as the depressurized suction port 28, splaying also in the running direction (arrow A) of the filter cloth 1. The mount frame 67 carries groups of filter cloth guide rolls 29b, 29a and 29b. These rolls 29b, 29b incline outwardly with respect to the running direction A of the filter cloth 1. The splay angle α of the depressurized suction port 28 to one side from the central axis of the port 28 is set in the range of 0.5–5 degrees. In the example of FIGS. 8 and 10. The roll length of the central guide rolls 29a gradually increases in the running direction A of the filter cloth, while the roll length of right and left guide rolls 29b, 29b remains constant in the running direction A of the filter cloth 1.

Figure 9:
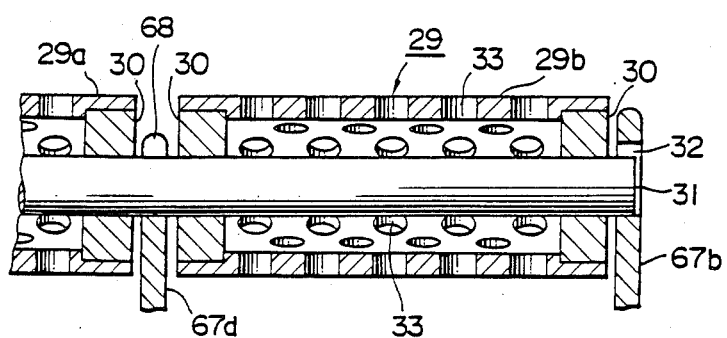
FIG. 9 is a partial sectional view of the area of the filter cloth guide roll.

In FIGS. 8 and 9, a set of opposed filter cloth guide rolls 29b, 29a, 29b are spacedly supported free to rotate on a single shaft 31 via the bearings 30, 30.

Both ends of the shaft 31 engage the non-open holes 32, 32 bored on the left side 67a and on the right side 67b of the mount frame 67 and they are supported at these holes 32, 32. Meanwhile, the midparts between the filter cloth guide rolls 29b and 29a and between 29a and 29b engage the U-shaped open holes 68, 68 bored on the left auxiliary frame 67c and on the right auxiliary frame 67d of the mount frame 67 and these parts are supported by these frames 67c and 67d. The shaft 31 is elastic and flexible to a certain extent and therefore even when three guide rolls 29b, 29a, 29b are preliminarily carried by the single shaft 31, the engagement and support at the non-open holes 32, 32 or at the open holes 68, 68 will be satisfactory. When lifted by the hand, the filter cloth guide rolls 29b, 29a, 29b together with the shaft 31 can be readily removed with both ends disengaged from the non-open holes 32, 32.

As indicated in FIG. 8, each filter cloth guide roll 29 is composed of a perforated roll 29X and a solid roll 29Y, the perforated roll 29X being located upstream in the running direction of filter cloth 1 and the solid roll 29Y located elsewhere.

The perforated roll 29X is for instance a cylinder with numerous holes bored in a zigzag pattern or a solid cylinder cut circumferentially or axially with grooves.

When a perforated roll 29X is employed, a high suction effect can be obtained at low power without largely decreasing the effective open area of the depressurized suction port 28, even if such perforated rolls 29X are densely arranged.

By contrast, the solid roll 29Y is a cylinder roll with a smooth surface. Perforated rolls 29X are set upstream of the depressurized suction port 28 in the running direction A of the filter cloth where the greater part of the liquid content of the solid-liquid mixture 10 supplied on the filter cloth 1 passes through the filter, while inexpensive solid rolls 29Y are located elsewhere, where little passage of the liquid content takes place. Depending on the conditions given, all of the filter cloth guide rolls 29 may be solid rolls.

The splaying of the mount frame 67 and the arrangement of the filter cloth guide rolls 29 may be designed as mentioned below.

Figure 11:
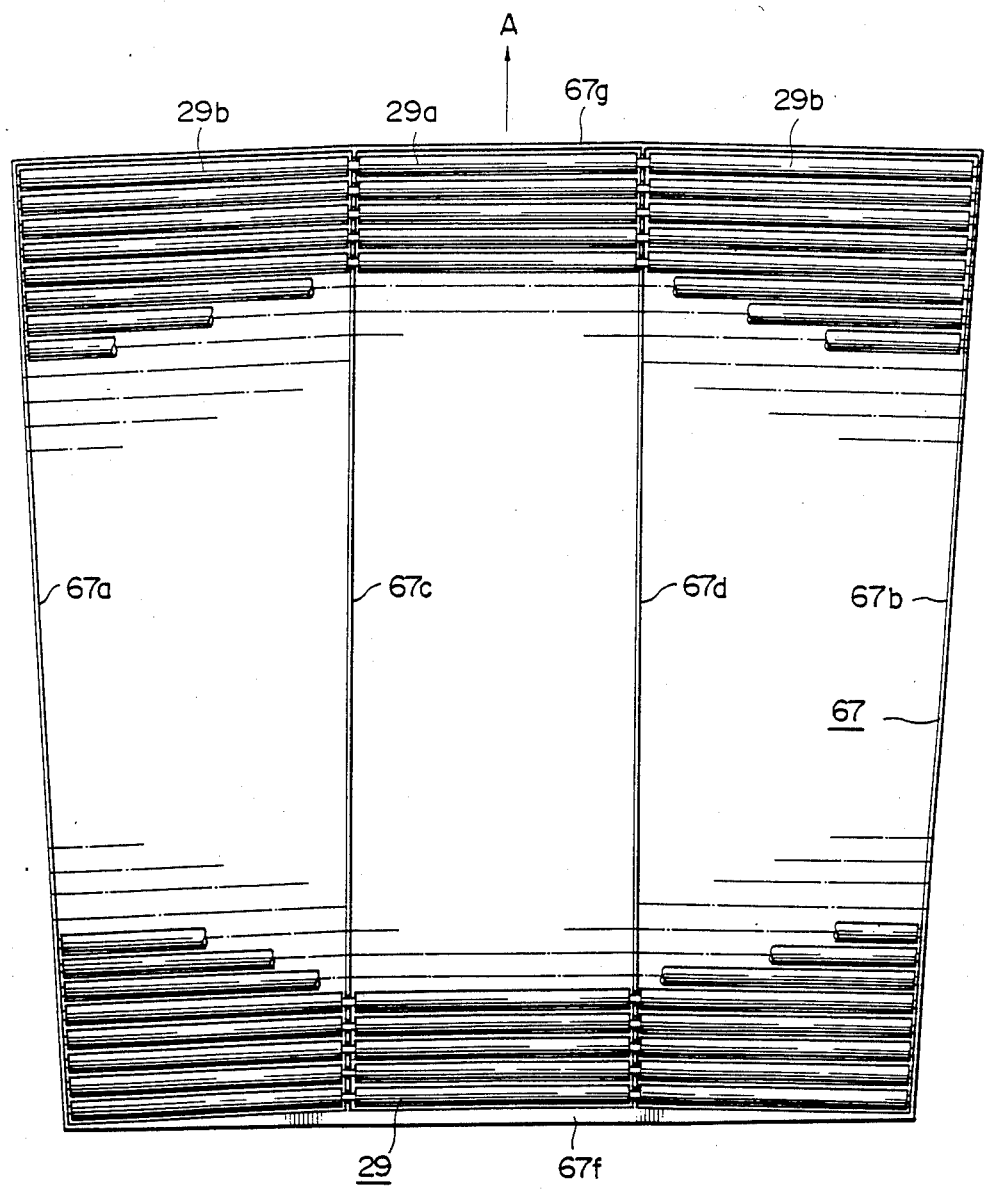

In FIG. 11 the groups 29 of filter cloth guide rolls consist of a central group 29a, a right group 29b and a left group 29b. The roll length of the central rolls 29a remains constant in the running direction A of the filter cloth, while the roll length of the right and left rolls 29b, 29b increase gradually in the running direction of the filter cloth.

Figure 12:
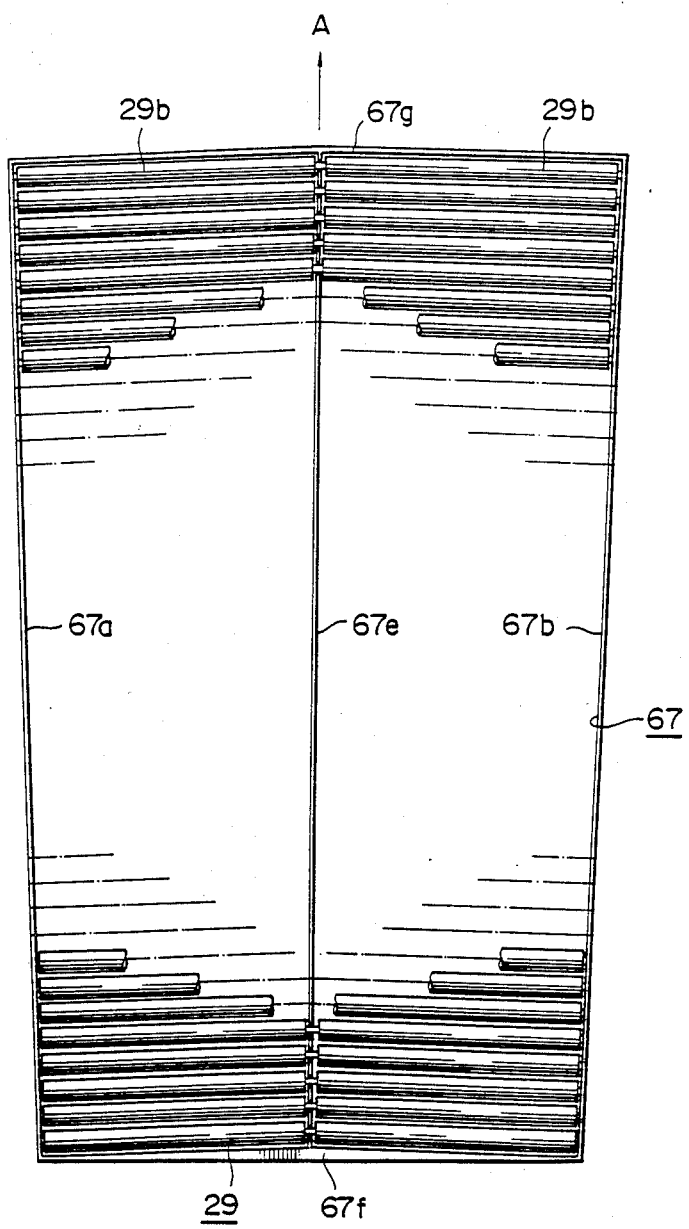

In FIG. 12, the groups 29 of filter cloth guide rolls consist of a right group 29b and a left group 29b and the roll length of both groups 29b, 29b increases gradually in the running direction A of the filter cloth.

Figure 13:
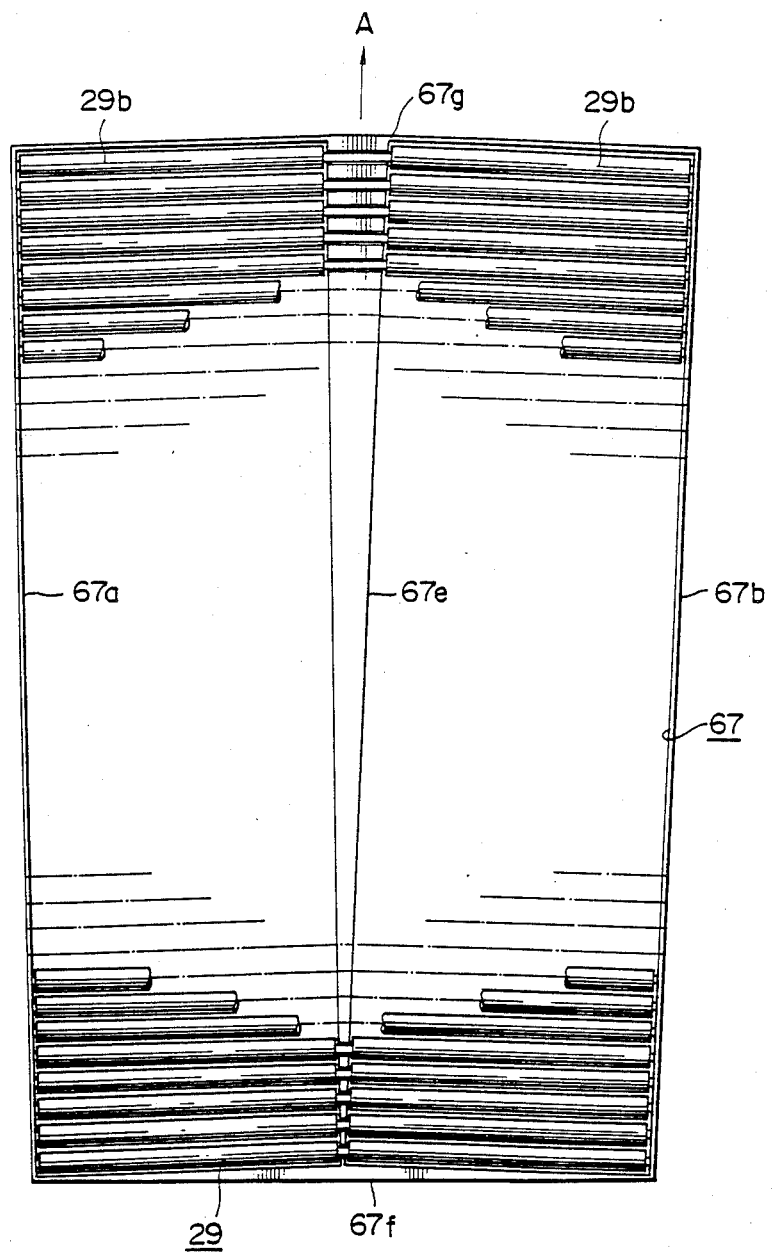

In FIG. 13, the groups 29 of filter cloth guide rolls consist of two groups 29b, 29b and the width of the auxiliary frame 67e located between these two groups 29b, 29b increase gradually in the running direction A of the filter cloth. The roll length remains constant in the running direction A of the filter cloth 1.

Figure 19:
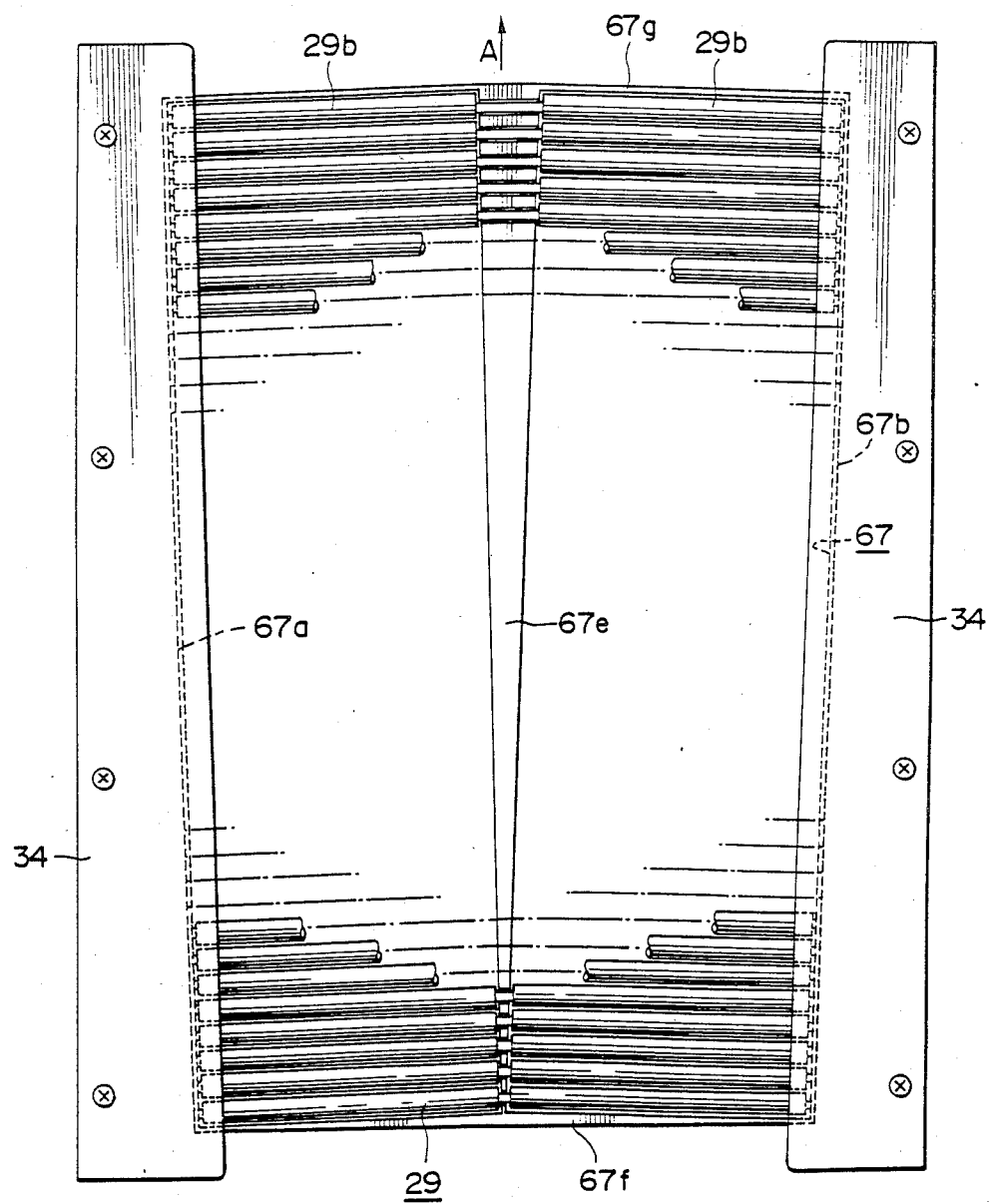
Figure 20A:
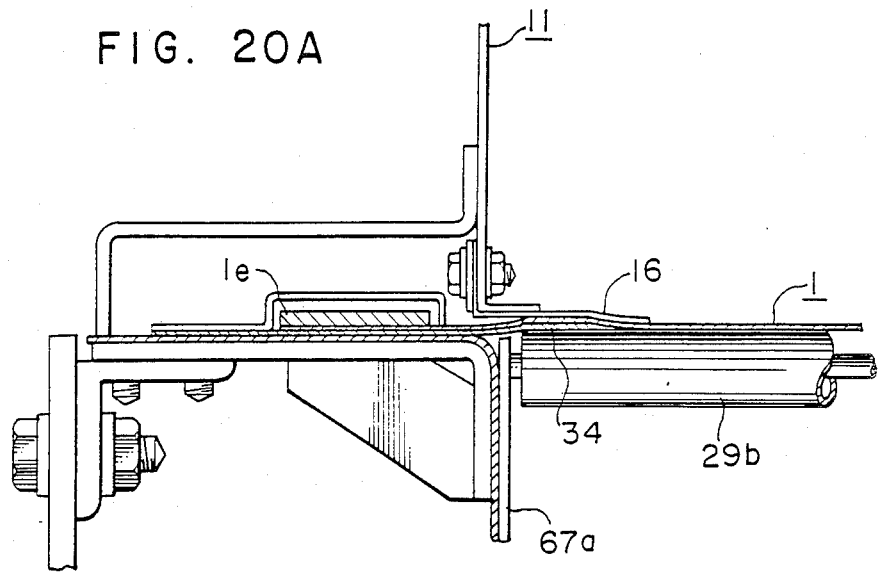
FIG. 20A is a partial sectional view of the area of filter cloth edge at the depressurizing suction means in the presence of a filter cloth control sheet.

As illustrated in FIG. 20A, the splay configuration of the depressurized suction port 28 may be formed by covering the outer end of the filter cloth guide rolls 29 with the suction port control sheet 34, 34. Thereby, as indicated in FIGS. 14 to 19, the inside edges of the right and left suction port control sheets 34, 34 will limit both sides of the depressurized suction port 28, while the space bounded by the frames 67f, 67g of the mount frame 67, forward and rearward in the running direction A of the filter cloth, and the inside edges of the suction port control sheets 34, 34 will make the depressurized suction port 28. The right and left suction port control sheets 34, 34 extend inside of the right and left mount frames 67a, 67b of the mount frame 67. Therefore, in the presence of the suction port control sheets 34, 34, the depressurized suction port 28 will have its inside edges on the right and left limited not by the right and left mount frames 67a, 67b, but by the suction port control sheets 34, 34.

Figure 20B:
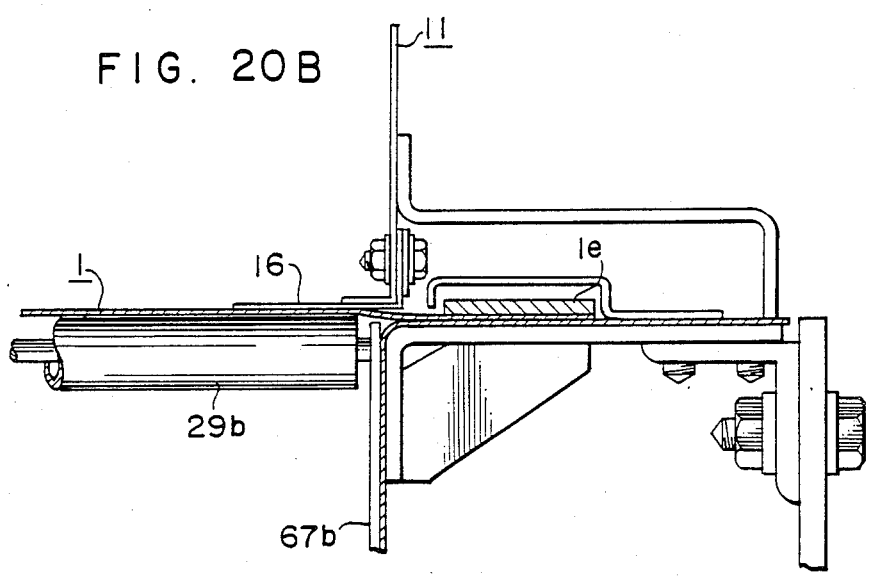
FIG. 20B is a partial sectional view of the area of filter cloth edge at the depressurizing suction means in the absence of a filter cloth control sheet.

FIG. 20B is a case of the suction port control sheets are absent.

Figure 14:
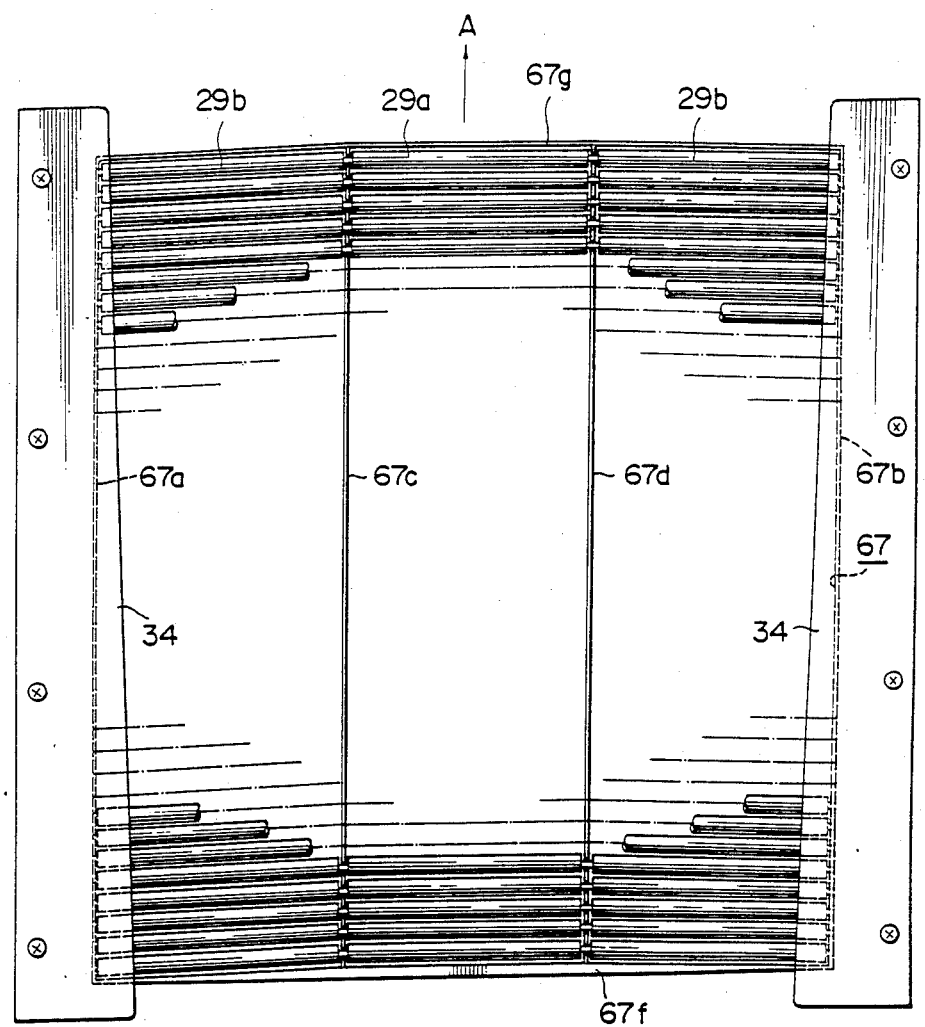

In FIG. 14, the groups 29 of filter cloth guide rolls consist of a central group 29a, a right group 29b and a left group 29b. The roll length of the central group 29a and the roll length of the right and left groups 29b, 29b remain constant in the running direction A of the filter cloth. The inside edges of the right and left suction port control sheets 34, 34 gradually expand in the running direction A of the filter cloth.

Figure 15:
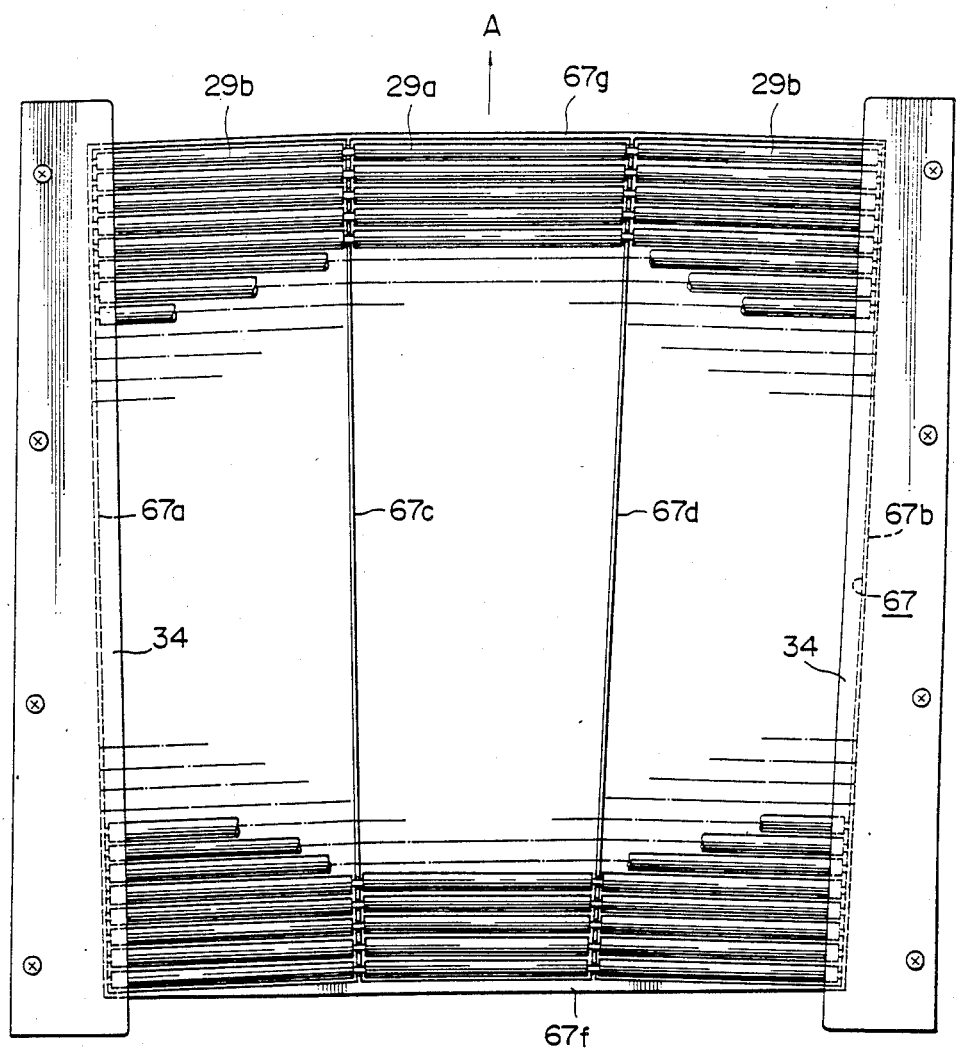

In FIG. 15, the groups 29 of filter cloth guide rolls consist of a central group 29a, a right group 29b and a left group 29b. The roll length of the central group 29a increases gradually in the running direction A of the filter cloth, while the roll length of the right and left groups 29b, 29b remains constant in the running direction A of the filter cloth. The inside edges of the right and left suction port control sheets 34, 34 expand gradually in the running direction A of the filter cloth.

Figure 16:
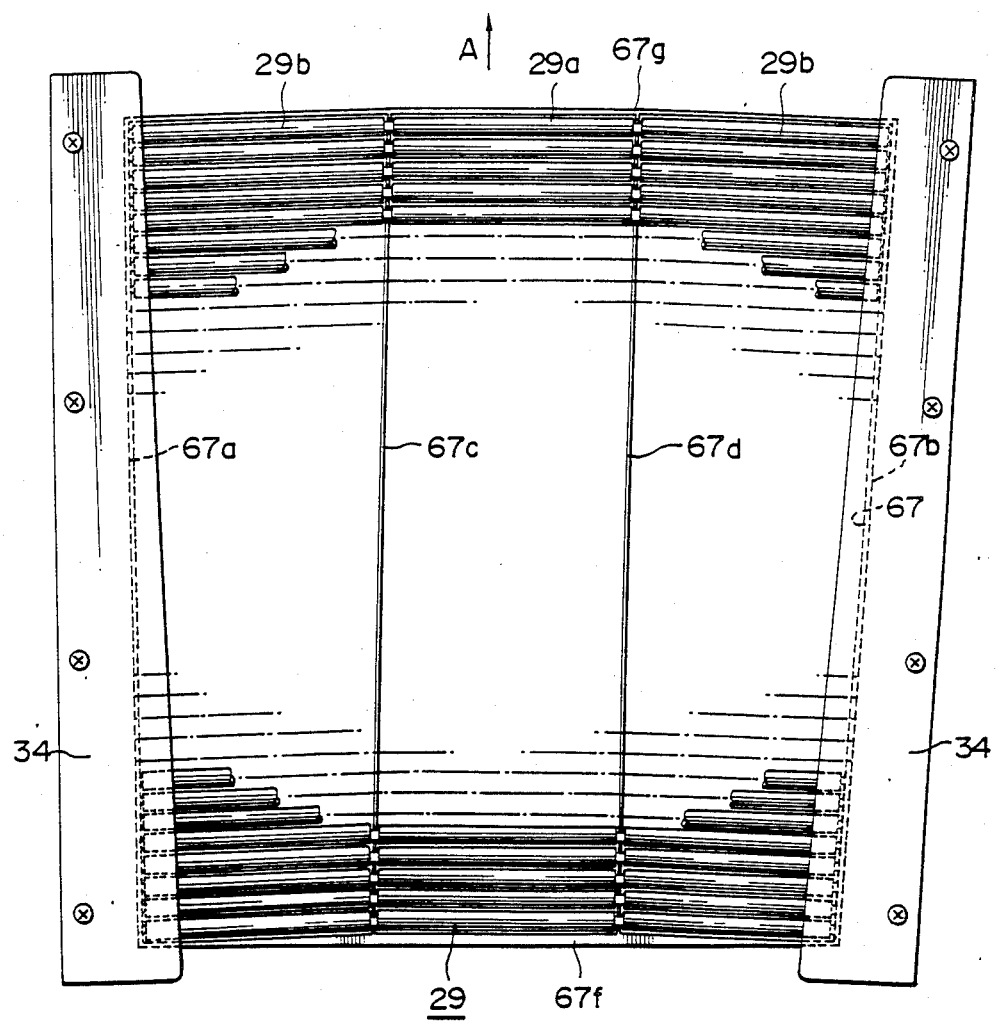

In FIG. 16, the groups 29 of filter cloth guide rolls consist of a central group 29a, a right group 29b and a left group 29b. The roll length of the central group 29a remains constant in the running direction A of the filter cloth, while the roll length of the right and left groups 29b, 29b increase gradually in the running direction A of the filter cloth. Inside edges of the right and left suction port control sheets 34, 34 expand gradually in the running direction A of the filter cloth.

Figure 17:
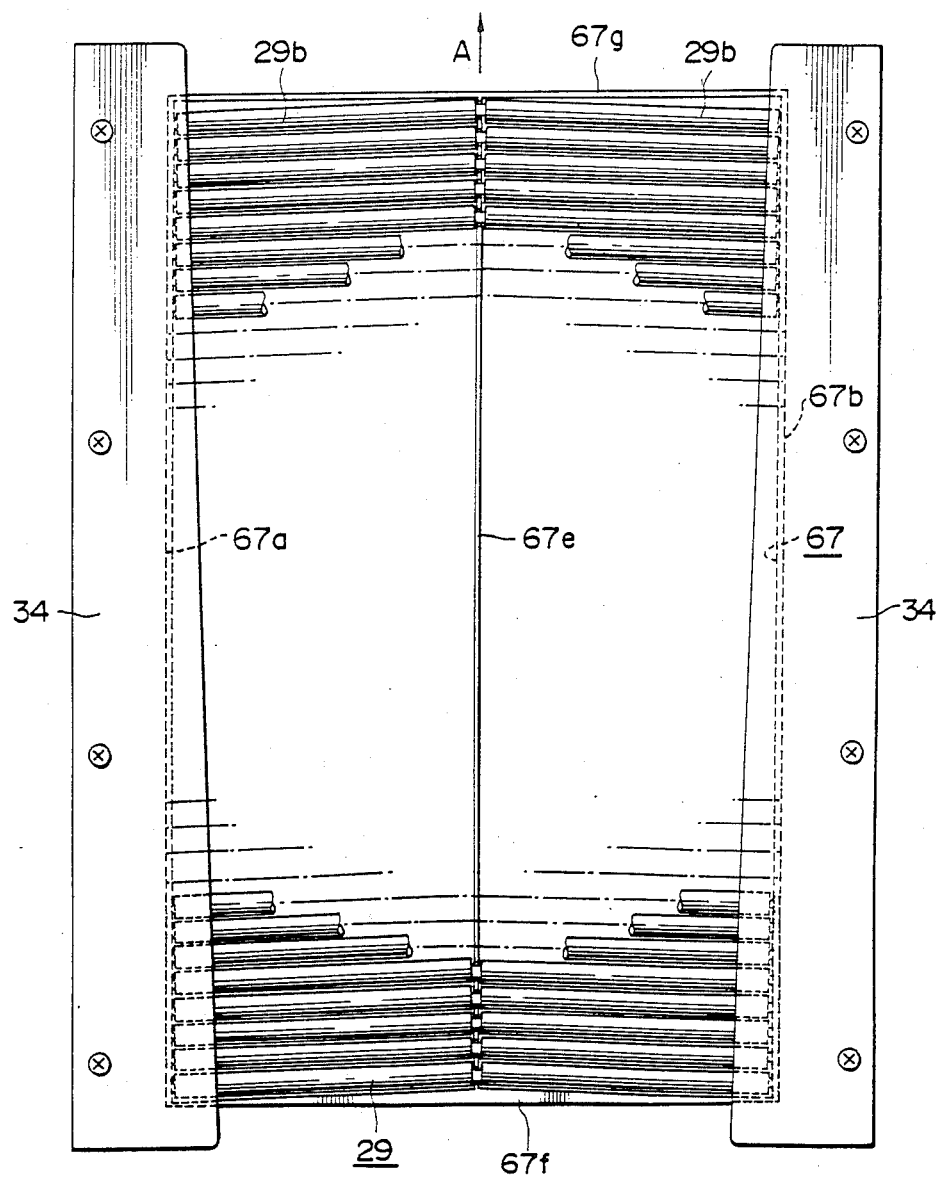

In FIG. 17 the groups 29 of filter cloth guide rolls consist of a right group 29b and a left group 29b. The roll length of the right and left groups 29b, 29b remains constant in the running direction A of the filter cloth. Inside edges of the right and left suction port control sheets 34, 34 expand gradually in the running direction A of the filter cloth.

Figure 18:
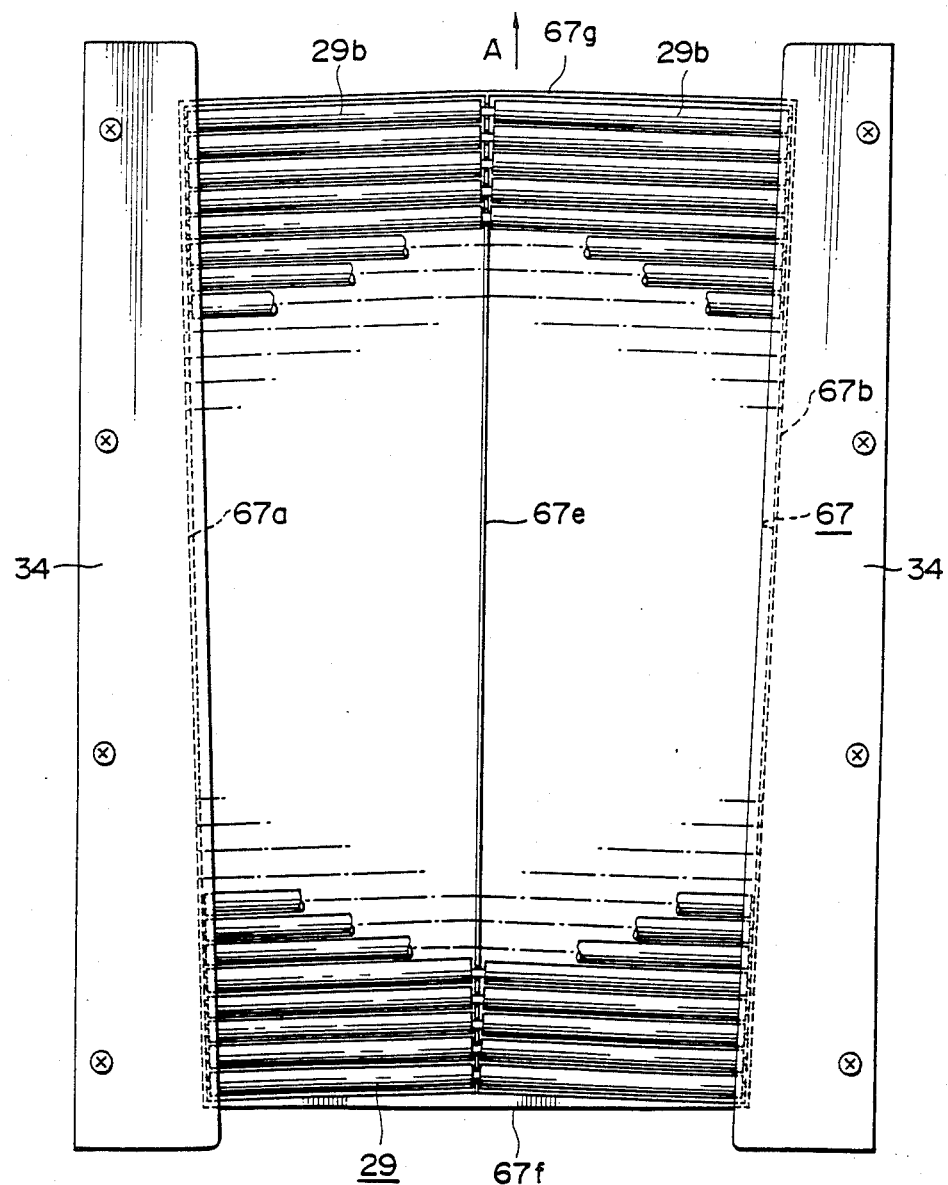

In FIG. 18, the groups 29 of filter cloth guide rolls consist of a right group 29b and a left group 29b. The roll length of the right and left groups 29b, 29b increase gradually in the running direction A of the filter cloth. Inside edges of the right and left suction port control sheets 34, 34 expand gradually in the running direction A of the filter cloth.

In FIG. 19, the groups 29 of filter cloth guide rolls consist of a right group 29b and a left group 29b. The roll length of the right and left groups 29b remains constant in the running direction A of the filter cloth and the spacing of the right and left groups 29b, 29b becomes gradually wider in the running direction A of the filter cloth. Inside edges of the right and left suction port control sheets 34, 34 gradually expand in the running direction A of the filter cloth.

Turning again to FIGS. 1 and 2, a transfer drum 9 and compression rolls 6, 7, 8 are installed in opposition to each other across the filter cloth 1 between the guide roll 4 and the drive roll 2. Facing the surface of the transfer drum 9 there is a wedge scraper 35. The scaper 35 is movable up to or away from the surface of the transfer drum 9. Thus the scraper 35 can be intermittently brought into contact with the surface of the transfer drum 9 or set off the transfer drum or moved up and down the transfer drum 9.

Directly beneath the scraper 35 is installed a chute 37 (cake discharge means) which carries out of the device the filter cake 36 scraped off by the scraper 35.

In the device illustrated in FIGS. 1 and 2, the transfer drum 9, the compression rolls 6, 7 8, the scraper 35 and the chute 37 constitute the non-filterable content withdrawing means.

Downstream of the transfer drum 9 and upstream of the filter cloth wash means in the running direction A of filter cloth there may be installed an air blast nozzle in opposition to the surface of the filter cloth 1. Such an air blast nozzle may be coupled in use with the scraper 35 and the chute 37.

In the illustrated example there are three compression rolls 6, 7, 8, but more than one roll will suffice and their number is not limited. The compression rolls 6, 7, 8 are being urged toward the transfer drum 9 by means of the springs 38, 38, 38. Urging by the springs assures uniform pressure application in the width direction of the filter cloth 1. Upstream of the compression rolls 6, 7, 8 in the running direction A of the filter cloth there may be installed a dewatering means such as a board, a sheet, a water suction nozzle or an air blast nozzle in contact with or in proximity to the compression rolls 6, 7, 8.

In FIG. 1, reference numeral 39 is a water spray nozzle for washing the front side of the filter cloth 1 (front surface wash nozzle), and reference numeral 40 is a water spray nozzle for washing the backside of the filter cloth 1 (back-wash nozzle). Between these two nozzles 39 and 40 comes a dewatering roll 41 which contacts the surface of the filter cloth 1 and removes water from the filter cloth 1. At a position opposed to the water spray nozzle 39 there is installed a filter cloth hold member 57 consisting of a piping.

Figure 24:
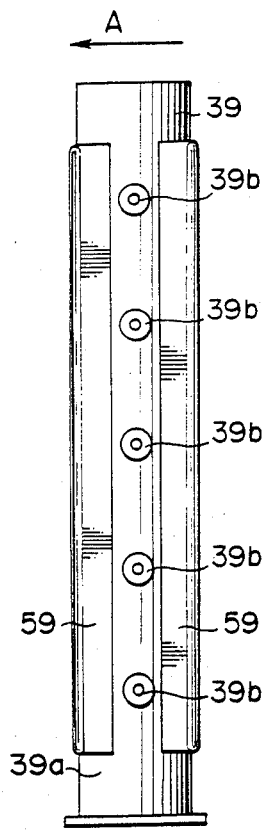
FIG. 24 is a plan view of a water spray nozzle.
Figure 25:
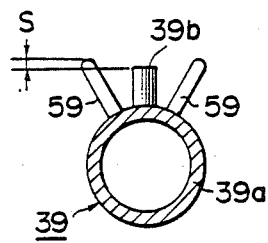
FIG. 25 is a sectional view of the water spray nozzle in FIG. 24.

The filter cloth hold member 57 may be fabricated of a corrosion-proof, rigid material such as stainless steel, vinyl chloride or aluminum instead of a piping and may be designed as a flat plate or perforated plate. The water spray nozzle 39, as illustrated in FIGS. 24 and 25, is a corrosion-proof pipe of stainless steel, aluminum or vinyl chloride. It comprises a water intake pipe 39a equipped with a flange at one end in the longitudinal direction for connection to the pipe for supply of washing water, a plurality of nozzle elements 39b, 39b . . . spacedly fitted in rows to the water intake pipe 39a, and two plate filter cloth guide members 59, 59 installed along the water intake pipe 39a and before and after the nozzle elements 39b, 39b . . . in the running direction A of the filter cloth. The water intake pipe 39a is set with its longitudinal direction aligned with the width direction of the filter cloth 1. The spacings of the nozzle elements 39b, 39b . . . are adjusted such that the washing water ejected from the nozzle elements 39b, 39b . . . may fall onto the surface of the filter cloth 1 with a slight overlapping. The filter cloth guide members 59, 59 are usually fabricated of the same materials as the water intake pipe 39a and directly welded, bonded or screwed to the water intake pipe 39a. The length of the guide members 59, 59 is greater than the total length of the nozzle elements 39b, 39b . . . and the tip of these guide members protrudes by an amount of S beyond the tip of the nozzle elements 39b, 39b . . . so that the tips of the nozzle elements 39, 39b . . . do not touch the filter cloth 1. Moreover, the tip of the guide members is rounded smooth lest it should injure the filter cloth 1 even when it happens to touch the filter cloth 1.

The construction of the water spray nozzle 39 applies also to the water spray nozzle 40 illustrated in FIG. 1. At a position opposed to the water spray nozzle 40, that is, on the front side of the filter cloth 1, there is installed filter cloth hold members 62, 62, spaced from each other, which consist each of two rolls as a set.

Figure 26:
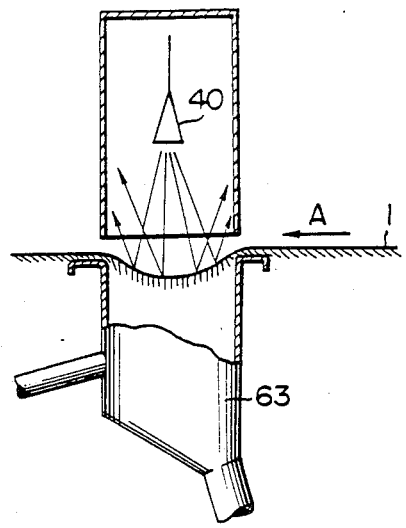
FIG. 26 is a sectional view showing the area of a depressurizing suction tank when the depressurizing suction tank is installed.

As indicated in FIG. 26, at a position opposed to the water spray nozzle 40 there may be installed a depressurizing suction tank 63 covering the filter cloth hold members 62, 62 or the suction tank 63 may substitute for the filter cloth hold members 62, 62. The filter cloth hold members 62, 62 may consist of pipes or rods instead of rolls.

The dewatering roll 41 consists of a set of filter cloth control rolls 41a, 41b which serve to bend the filter cloth 1 in an S-letter curve. After passing the control rolls 41a, 41b, the filter cloth 1 makes an up-gradient in the running direction A of the filter cloth. The dewatering roll 41 serves to prevent the water of the water spray nozzle 40 from flowing in a reverse direction to the running direction A of the filter cloth. Further, in between the filter cloth control roll 41b and the filter cloth hold member 62 and on the front side of the filter cloth 1 there may be installed, in contact with the filter cloth 1, a comb means with plastic or other synthetic fiber piles. The comb means may consist of a flexible board made of foamed polyethylene or a synthetic rubber.

In the running direction A of the filter cloth 1 between the dewatering roll 41 and the filter cloth hold member 63 or the solid-liquid mixture supply means 11, there is installed a comb means 66 in contact with the filter cloth 1. This comb means 66 is the same as the one mentioned above.

Now the function of the device is to be described. A solid-liquid mixture is supplied onto the filter cloth 1 circulating in the direction of arrow A, from the solid-liquid mixture supply means 11. The liquid content of the supplied mixture passes through the filter cloth 1 by gravity or by depressurized suction of the depressurizing suction means 23 and it collects in the filtrate hold tank 24. In spite of the sucking force acting thereon, the filter cloth 1 is moved in a stable manner the filter cloth guide rolls 29 without being greatly deflected. Thereby the edge of the roll will frictionally contact the filter cloth 1, with an expanded width matching the splayed degree, and there is no possibility of only one limited area of the roll linearly touching the filter cloth 1. Thus with damage to the filter cloth prevented, the service life of the filter cloth is drastically increased and over a long period the solid-liquid separation performance and the treating ability of the device can be maintained at a high level. Thus, damage to the filter cloth 1 as the result of the edge of the suction port 28 linearly abrading the filter cloth 1 is less likely on account of the suction port being splayed.

The liquid content collecting in the filtrate hold tank 24 is discharged out of the device via the discharge port 27a, the discharge pipe 27 and the sealing pot 69. Meanwhile, the content which has not passed through the filter cloth 1, i.e., the non-filterable content, is carried on with movement of the filter cloth 1 to the transfer drum 9 and the compression rolls 6, 7, 8, where the greater part of the liquid content is extracted by compression and it yields the so-called filter cake. In the device illustrated in FIG. 1, the drive roll 2 acts concurrently as a compression roll. The cake is then transferred onto the surface of the transfer drum, from which the cake is removed by the scraper 35 and discharged as a waste cake 36 out of the device through the chute 37.

Next the filter cloth 1 is flushed from the front and back sides by the water spray nozzle 39 (front surface wash nozzle) and the water spray nozzle 40 (back-wash nozzle). Being supported on the filter cloth hold members 57, 62 opposed to the nozzles 39, 40, the filter cloth 1 does not deflect, distort or vibrate.

Now with the naps 1b rectified by the comb means 66, the washed filter cloth 1 is again carried to the solid-liquid mixture supply means 11.

Figure 21:
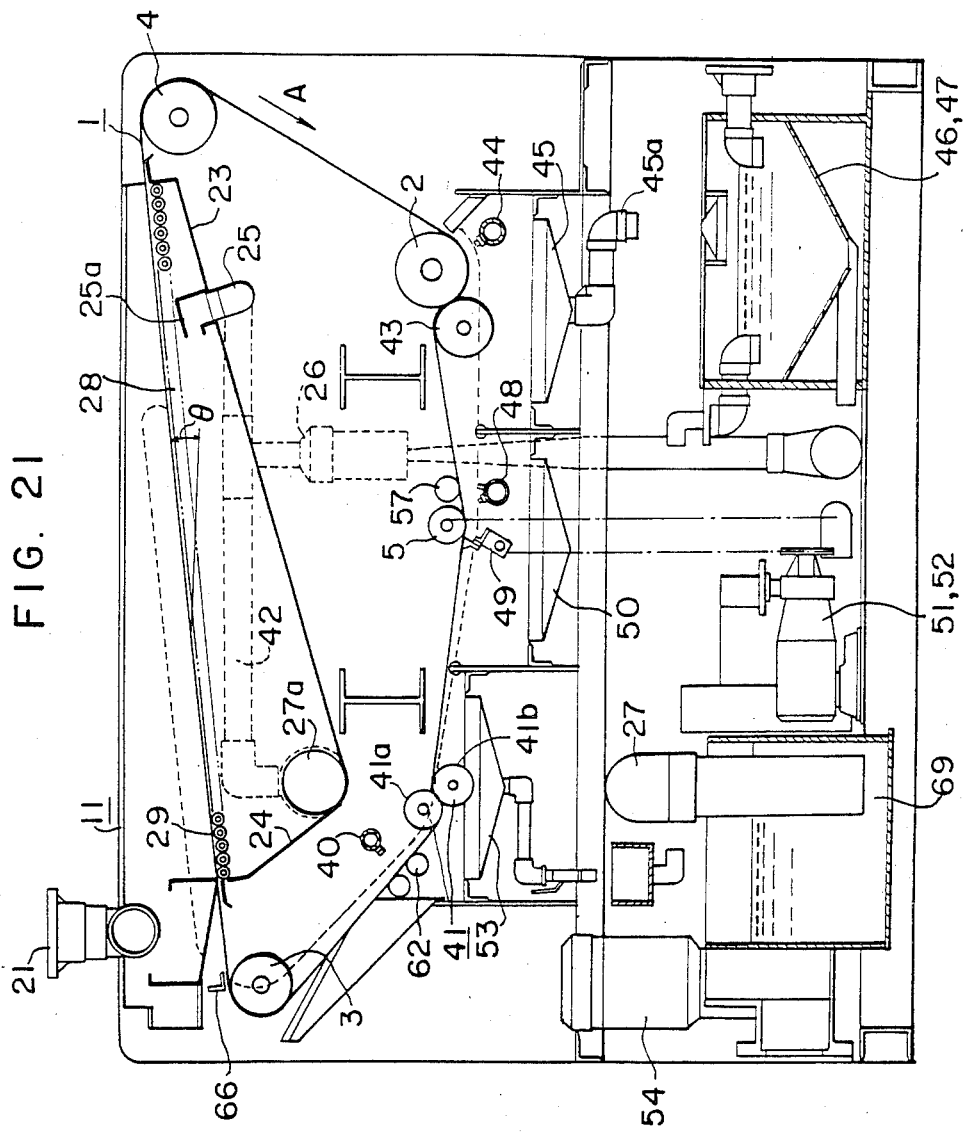
FIG. 21 is a schematic side view of a filter of the traveling filter cloth type in another embodiment of the solid-liquid separation device according to the present invention.
Figure 22:
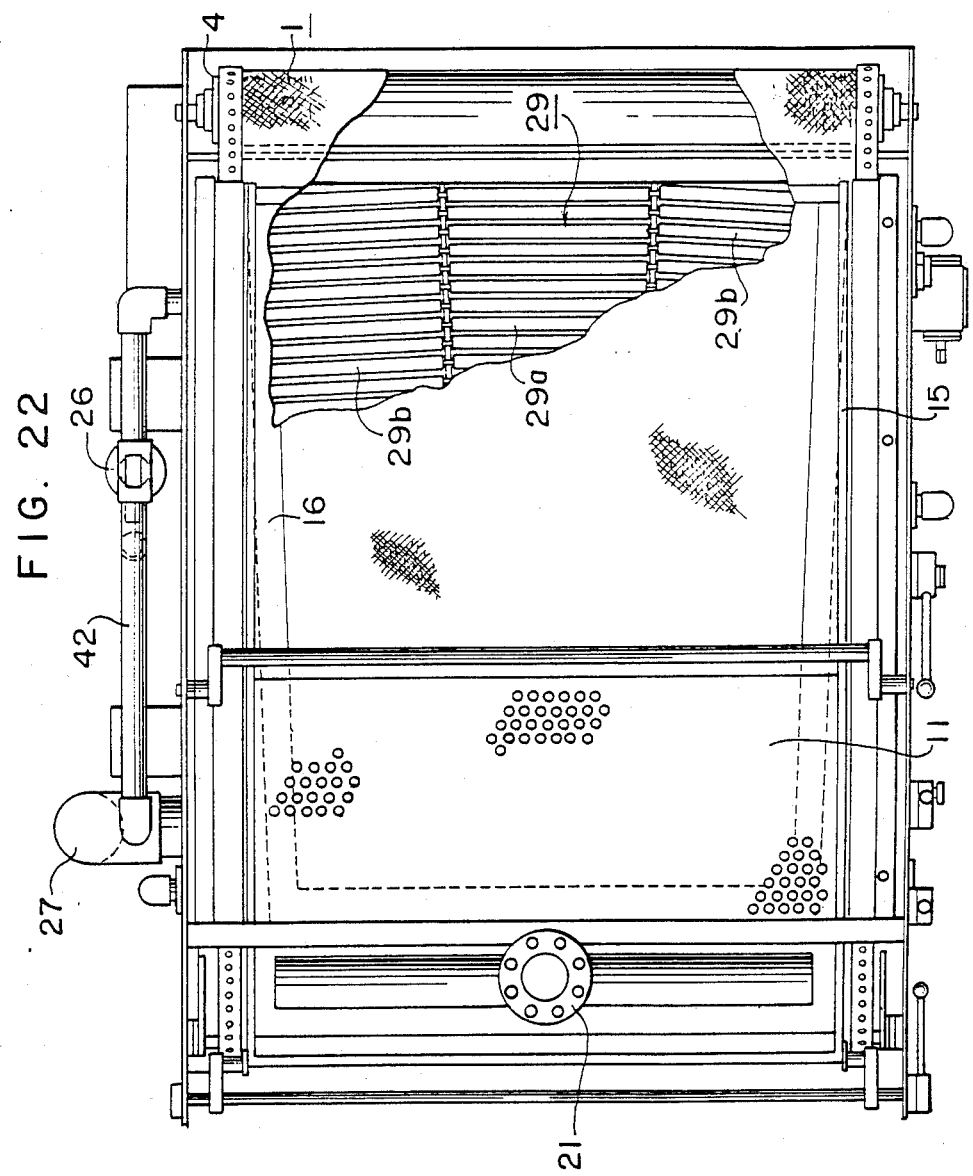
FIG. 22 is a plan view of the filter of FIG. 21.
Figure 23:
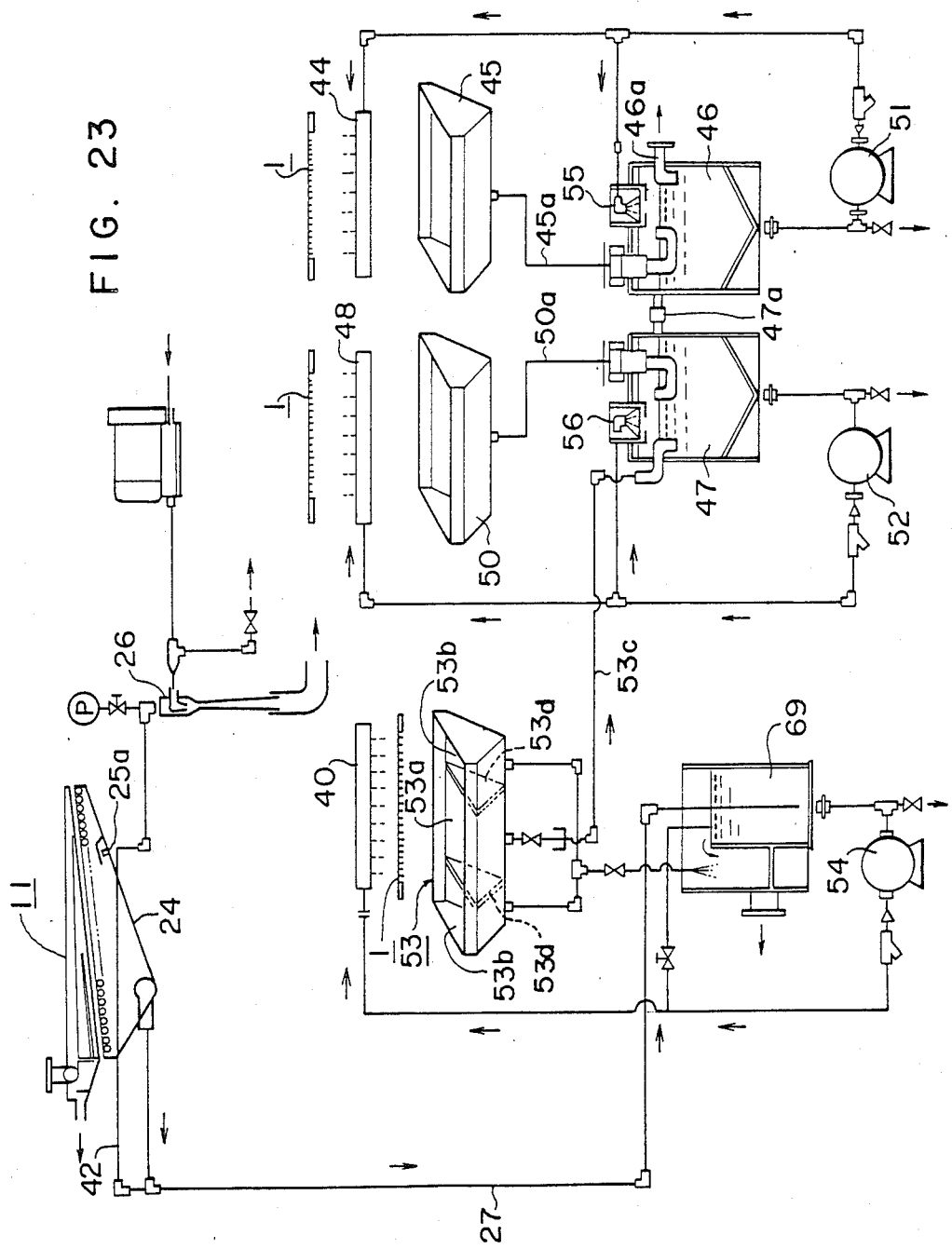
FIG. 23 is a block diagram of the filter of FIG. 21.

FIGS. 21 to 23 illustrate a filter of travelling filter cloth type of another embodiment of the present invention different from the one illustrated in FIGS. 1 and 2. In the embodiment of FIGS. 21 to 23 the non-filterable content withdrawing means is a water spray nozzle installed opposite the surface of the filter cloth. Like parts in these embodiments are denoted by like symbols with description omitted and only different details are explained.

In FIGS. 21 to 23, reference numeral 1 is an endless filter cloth which is stretched in tension over the drive roll 2 and three guide rolls 3, 4, 5 and is circulated in the direction of arrow A on a definite path defined by the drive roll 2 and the guide rolls 3, 4, 5. In opposition to the drive roll 2 there is installed a nip roll 43 across the filter cloth 1.

At a position opposed to the drive roll 2, there is installed a water spray nozzle 44 for withdrawing the non-filterable content (collecting nozzle) and below this nozzle is located a non-filterable content hold tank 45, the tank 45 being connected via the piping 45a to a collecting tank 46. The piping 45a opens horizontally or upward into the collecting tank 46.

At a position opposed to the guide roll 5, there is installed a water spray nozzle 48 for withdrawing the non-filterable content. Further, in opposition to the guide roll 5, there is installed a dewatering board 49 in contact with the surface of the filter cloth 1, and in opposition to the water spray nozzle 48, there is installed a filter cloth hold member 57 upstream of the guide roll 5.

Below the water spray nozzle 48 and the dewatering board 49 is located a non-filterable content hold tank 50, which communicates via the piping 50a to a collecting tank 47. The piping 50a opens horizontally or upward into the collecting tank 47.

Further a washing water hold tank 53 is located below dewatering roll 41 and the filter cloth hold member 62. The washing water hold tank 53 is partitioned by the weirs 53d, 53d into a back-wash water receive tank 53a and excess water receive tanks 53b, 53b on both sides of the tank 53a. The back-wash water receive tank 53a communicates via the piping 53c to the collecting tank 47, the piping 53c opening beneath the liquid level of the collecting tank 47. The collecting tank 47 and the collecting tank 46, arranged parallel to each other, communicate to each other via the piping 47a so that the collected liquid in the collecting tank 47 can be supplied to the collecting tank 46. The collecting tank 46 is equipped with the pipe 46a to discharge the liquid containing the non-filterable element to be sought. The entrance to the pipe 46a is located beneath the liquid level of the collecting tank 46.

The collecting tanks 46, 47 are connected via the collecting pumps 51, 52 to the water spray nozzles 44, 48 so that the liquid in the collecting tanks 46, 47 can be utilized as jet water from the water spray nozzles 44, 48. Part of the liquid sent from the collecting pumps 51, 52 to the water spray nozzles is supplied to defoaming nozzles 55, 56 (defoam means) located above the collecting tanks 46, 47.

The filtrate at the sealing pot 69 is sent via the back-wash water pump 54 to the water spray nozzle 40 (wash nozzle).

Next the function of the above-mentioned filter will be described. The mixture having solid content and liquid content, which is supplied onto the filter cloth 1 from the solid-liquid mixture supply means 11, is filtered by the action of the depressurizing suction means 23. The non-filterable content deposited on the filter cloth 1 goes to the water spray nozzle 44, to be flushed with a jet water issuing from the water spray nozzle 44. Then the non-filterable content is withdrawn in the collecting tank 46 via the non-filterable content hold tank 45. Thereby, the jet water issued from the water spray nozzle 44 and remaining on the filter cloth 1 is removed, being squeezed by a nip roll 43. Dewatering action of the nip roll 43 enhances the efficiency of reclamation.

The filter cloth 1 then proceeds to the position of the water spray nozzle 48, where in the same way as above the non-filterable content is withdrawn and at the same time the filter cloth 1 is flushed. The non-filterable content thus collected reaches the collecting tank 47 via the non-filterable content hold tank 50. The water remaining on the filter cloth 1 is removed by the dewatering board 49, thereby increasing the efficiency of reclamation.

The filter cloth 1 moves on and reaches the water spray nozzle 40, where the cloth is flushed from the backside by the nozzle 40. Thereupon, the back-wash water passing through the filter cloth collects in the back-wash water tank 53a and a part of the back-wash water is supplied as the liquid for collecting the non-filterable content to the collecting tank 47.

By varying the volume of this liquid, the concentration of the non-filterable content in the collecting tanks 46, 47 can be adjusted. The water failing to pass through the filter cloth 1 collects in the excess water receive tanks 53b, 53b and then it is discharged out of the device. The back-wash water tank 53a and the excess water receive tanks 53b, 53b are partitioned by the weirs 53d, 53d so that the excess water which is not sent from the back-wash water receive tank 53a to the collecting tank 47 flows over the weirs 53d, 53d into the excess water receive tanks 53b, 53b, to be discharged.

In the above example, the arranged sequence of the collecting tank 46 and the collecting tank 47 is reverse to the running direction A of the filter cloth and in this way the concentration of the non-filterable content in the collecting tank 47 can be maintained lower than that in the collecting tank 46, thereby improving the yield of the non-filterable content.

INDUSTRIAL APPLICATIONS OF THE INVENTION

The device according to the present invention has versatile uses. For instance, it is available for separation of solids and liquid contained in lake or river water. Other uses are for filtration, condensation and dewatering of sludge, scum, flocks, washing water waste, i.e., product generated in waste water treatment, including the so-called suspended solids such as excess waste sludge, a by-product from the activated sludge reactor, and the so-called slime coming out of the biological oxidation reactor using fixed slime. To be more specific, the device is available for solid-liquid separation of sludge resulting from drinking water treatment or sewerage, excess waste sludge originating from septic tanks, sludge yielded at night solid disposal plants, scum produced in the floatation equipment, coagulated flocks or sediments produced in the treatment of industrial effluents, and washing waste of various filters including the sand filter. Other conceivable applications include solid-liquid separation involved in paper making, pulp making, food processing, alcoholic drinks production, fermentation of "miso", and reclamation of useful elements in chemical processing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A solid-liquid separation device comprising;
an unidirectionally circulating endless filter cloth having a napped filter layer on its front surface;
a solid-liquid mixture supply means provided on the front side of said filter cloth;
a depressurizing suction means provided on the backside of said filter cloth adjacent to said solid-liquid mixture supply means;
said depressurizing suction means including a depressurized suction port facing the backside of said filter cloth and splaying in the running direction of said filter cloth;
said depressurized suction port having at least one group of filter cloth guide rolls on each of left and right sides of the running direction of said filter cloth; and
the filter cloth guide rolls in each left and right group of the filter cloth guide rolls angled outwardly in the running direction of said filter cloth;
a non-filterable content withdrawing means provided downstream of said solid-liquid mixture supply means and said depressurizing suction means in the running direction of said filter cloth, said non-filterable content withdrawing means including:
a transfer drum installed on the front side of said filter cloth;
at least one compression roll installed on the backside of said filter cloth in opposition to said transfer drum; and
a scraper installed in opposition to said transfer drum; and
a filter cloth wash means provided downstream of said non-filterable content withdrawing means in the running direction of said filter cloth and located between said non-filterable content withdrawing means and said solid-liquid mixture supply means or said depressurizing suction means, wherein said depressurizing suction means further includes a pair of suction port control sheets;
said suction port control sheets covering both outside edge portions of the filter cloth guide rolls in the left and right groups;
said suction port control sheets having insides edges defining edges of said depressurized suction port; and
means for increasing a distance between the inside edges of said suction port control sheets along the running direction of said filter cloth, so that said filter cloth can slidingly contact the inside edges of said suction port control sheets with a width determined by an inclination of the inside edges of said suction port control sheets.

2. The solid-liquid separation device of claim 1, in which the splay angle of said depressurized suction port is in the range of 0.5–5 degrees.

3. The solid-liquid separation device of claim 1, in which the groups of filter cloth guide rolls consist of a central group, a right group and a left group.

4. The solid-liquid separation device of claim 3, in which the roll length of filter cloth guide rolls in the central group and the roll length of filter cloth guide rolls in the right and left groups remain respectively constant in the running direction of said filter cloth.

5. The solid-liquid separation device of claim 3, in which the roll length of filter cloth guide rolls in the central group increases gradually in the running direction of said filter cloth, while the roll length of filter cloth guide rolls in the right and left groups remains constant in the running direction of said filter cloth.

6. The solid-liquid separation device of claim 3, in which the roll length of filter cloth guide rolls in the central groups remains constant in the running direction of said filter cloth, while the roll length of filter cloth guide rolls in the right and left groups increases gradually in the running direction of said filter cloth.

7. The solid-liquid separation device of claim 1, in which the groups of filter cloth guide rolls consist of a right group and a left group.

8. The solid-liquid separation device of claim 7, in which the roll length of filter cloth guide rolls in the right and left groups remains constant in the running direction of said filter cloth.

9. The solid-liquid separation device of claim 7, in which the roll length of filter cloth guide rolls in the right and left groups increases gradually in the running direction of said filter cloth.

10. The solid-liquid separation device of claim 7, in which the roll length of filter cloth guide rolls in the right and left groups remains constant in the running direction of said filter cloth and the spacing of the right and left groups of the filter cloth guide rolls becomes gradually wider in the running direction of said filter cloth.

11. The solid-liquid separation device of claim 1, in which said depressurizing suction means is a tank equipped with a suction pipe and a liquid-content discharge pipe, said suction pipe and said liquid-content discharge pipe being connected to each other through a pressure-equalizing pipe.

12. The solid-liquid separation device of claim 1, in which said filter cloth guide roll is a perforated roll.

13. The solid-liquid separation device of claim 1, in which said right and left groups of filter cloth guide rolls consist of a group of perforated rolls and a group of non-perforated rolls, said perforated roll group being located upstream in the running direction of said filter cloth.

14. The solid-liquid separation device of claim 1, in which the filter cloth guide rolls are supported on a mount frame installed at said depressurized suction port and the filter cloth guide rolls opposed to each other in the right and left groups are spacedly supported on a common shaft, both ends of said shaft being engaged and held at non-open holes provided in said mount frame, and the midpart between said right and left filter cloth guide rolls being engaged and held at open holes provided on said mount frame.

15. The solid-liquid separation device of claim 1, in which said solid-liquid mixture supply means comprises: a solid-liquid mixture level adjust tank having an overflow weir to supply the solid-liquid mixture and an overflow weir to discharge the solid-liquid mixture, which is higher than the overflow weir for the solid-liquid mixture supply; a solid-liquid mixture discharge means connected to said solid-liquid mixture level adjust tank on the side of said overflow weir for solid-liquid mixture discharge; and a solid-liquid mixture intake means installed opposite said solid-liquid mixture level adjust tank.

16. The solid-liquid separation device of claim 1, in which said filter cloth wash means is a water spray nozzle installed opposite the surface of said filter cloth.

17. The solid-liquid separation device of claim 16, in which a filter cloth hold member is installed at a position opposed to said water spray nozzle on the backside of said filter cloth.

18. The solid-liquid separation device of claim 16, in which said water spray nozzle comprises a water intake pipe extending in the width direction of the filter cloth; a plurality of nozzle elements fitted in rows to said water intake pipe; and a filter cloth guide member attached to said water intake pipe and protruding beyond said nozzle elements.

19. The solid-liquid separation device of claim 1, in which said filter cloth wash means comprises a water spray nozzle installed opposite the backside of filter cloth.

20. The solid-liquid separation device of claim 19, in which a comb means is installed on the front side of filter cloth upstream of said water spray nozzle in the running direction of filter cloth.

21. The solid-liquid separation device of claim 19, in which a depressurizing suction tank is installed on the front side of said filter cloth at a position opposed to said water spray nozzle.

22. The solid-liquid separation device of claim 19, in which a back-wash water receive tank and excess water receive tank are installed respectively below said water spray nozzle and said filter cloth, said excess water receive tank being located below both edges of said filter cloth.

23. The solid-liquid separation device of claim 1, in which said filter cloth wash means comprises: a pair of filter cloth control rolls installed downstream of said non-filterable content withdrawing means in the running direction of said filter cloth and between said non-filterable content withdrawing means and said solid-liquid mixture supply means; a water spray nozzle installed upstream of said solid-liquid mixture supply means and downstream of said filter cloth control rolls in the running direction of said filter cloth on the backside of said filter cloth; and a pair of filter cloth hold members installed on the front side of said filter cloth and spaced from each other at positions opposed to said water spray nozzle, said filter cloth being bent in an S-letter curve by said pair of filter cloth control rolls and said filter cloth forming an up-gradient in the running direction of said filter cloth after passage through said pair of filter cloth control rolls.

24. The solid-liquid separation device of claim 1, in which a comb means is installed in contact with the surface of said filter cloth downstream of said filter cloth wash means in the running direction of said filter cloth between said filter cloth wash means and said solid-liquid mixture supply means.

25. The solid-liquid separation device of claim 1, in which a water spray nozzle is installed on the front side of said filter cloth, downstream of said solid-liquid mixture supply means in the running direction of said filter cloth and at a position opposed to said depressurizing suction means.

26. The solid-liquid separation device of claim 1, in which said scraper can freely come into contact or out of contact with the surface of said transfer drum.

27. The solid-liquid separation device of claim 1, in which a cake discharge means is installed below said scraper.

28. The solid-liquid separation device of claim 1, in which said compression roll is provided with a means to urge said compression roll toward said transfer drum.

29. The solid-liquid separation device of claim 1, in which a dewatering means is installed upstream of said compression roll in the running direction of said filter cloth and in contact with or in proximity to said compression roll.

30. The solid-liquid separation device of claim 1, in which an air blast nozzle is installed downstream of said transfer drum, upstream of said filter cloth wash means in the running direction of said filter cloth in opposition to the surface of said filter cloth.

31. a solid-liquid separation device comprising;
a unidirectionally circulating endless filter cloth having a napped filter layer on its front surface;
a solid-liquid mixture supply means provided on the front side of said filter cloth;
a depressurizing suction means provided on the backside of said filter cloth adjacent to said solid-liquid mixture supply means;
said depressurizing suction means including a depressurized suction port facing the backside of said filter cloth and splaying in the running direction of said filter cloth;
said depressurized suction port having at least one group of filter cloth guide rolls on each of left and right sides of the running direction of said filter cloth; and
the filter cloth guide rolls in each left and right group of the filter cloth guide rolls angled outwardly in the running direction of said filter cloth;
a non-filterable content withdrawing means provided downstream of said solid-liquid mixture supply means and said depressurizing suction means in the running direction of said filter cloth, siad mon-filterable content withdrawing means including a water spray nozzle installed opposite the surface of said filter cloth; and
a filter cloth wash means provided downstream of said non-filterable content withdrawing means in the running direction of said filter cloth and located between said non-filterable content withdrawing means and said solid-liquid mixture supply means or said depressurizing suction means, wherein said depressurizing suction means further includes a pair of suction port control sheets;
said suction port control sheets covering both outside edge portions of the filter cloth guide rolls in the left and right groups;
said suction port control sheets having inside edges determining both edges of said depressurized suction port; and
means for increasing a distance between the inside edges of said suction port control sheets along the running direction of said filter cloth, so that said filter cloth can slidingly contact the inside edges of said suction port control sheets with a width determined by an inclination of the inside edges of said suction port control sheets.

32. The solid-liquid separation device of claim 31, in which a collected content receive tank is installed below said water spray nozzle, said water spray nozzle and said collected content receive tank being connected via a collected content-circulating piping.

33. The solid-liquid separation device of claim 32, in which said collected content receive tank and said water spray nozzle are connected to each other through a collecting tank equipped with a defoaming means.

34. The solid-liquid separation device of claim 31, in which the splay angle of said depressurized suction port which is determined by the inclination of each of said suction port control sheets is in the range of 0.5–5 degrees 35. The solid-liquid separation device of claim 31, in which the groups of filter cloth guide rolls consist of a central group, a right group and a left group.

36. The solid-liquid separation device of claim 31, in which the groups of filter cloth guide rolls consist of a right group and a left group.

37. The solid-liquid separation device of claim 31, in which said depressurizing suction means is a tank equipped with a suction pipe and a liquid-content discharge pipe, said suction pipe and said liquid-content discharge pipe being connected to each other through a pressure-equalizing pipe.

38. The solid-liquid separation device of claim 31, in which said filter cloth guide roll is a perforated roll.

39. The solid-liquid separation device of claim 31, in which said right and left groups of filter cloth guide rolls consist of a group of perforated rolls and a group of non-perforated rolls, said perforated roll group being located upstream in the running direction of said filter cloth.

40. The solid-liquid separation device of claim 31, in which the filter cloth guide rolls are supported on a mount frame installed at said depressurized suction port and the filter cloth guide rolls opposed to each other in the right and left groups are spacedly supported on a common shaft, both ends of said shaft being engaged and held at non-open holes provided in said mount frame, and the midpart between said right and left filter cloth guide rolls being engaged and held at open holes provided on said mount frame.

41. The solid-liquid separation device of claim 31, in which said solid-liquid mixture supply means comprises:
a solid-liquid mixture level adjust tank having an overflow weir to supply the solid-liquid mixture and an overflow weir to dischange the solid-liquid mixture, which is higher than the overflow weir for the solid-liquid mixture supply;
a solid-liquid mixture discharge means connected to said solid-liquid mixture level adjust tank on the side of said overflow weir for solid-liquid mixture discharge; and
a solid-liquid mixture intake means installed opposite said solid-liquid mixture level adjust tank.

42. The solid-liquid separation device of claim 31, in which said filter cloth wash means is a water spray nozzle installed opposite the surface of said filter cloth.

43. The solid-liquid separation device of claim 31, in which said filter cloth wash means comprises a water spray nozzle installed opposite the backside of filter cloth.

44. The solid-liquid separation device of claim 31, in which said filter cloth wash means comprises:
a pair of filter cloth control rolls installed downstream of said non-filterable content withdrawing means in the running directon of said filter cloth and between said non-filterable content withdrawing means and said solid-liquid mixture supply means;
a water spray nozzle installed upstream of said solid-liquid mixture supply means and downstream of said filter cloth control rolls in the running direction of said filter cloth on the backside of said filter cloth; and
a pair of filter cloth hold members installed on the front side of said filter cloth and spaced from each other at positions opposed to said water spray nozzle, said filter cloth being bent in an S-letter curve by said pair of filter cloth control rolls and said filter cloth forming an up-gradient in the running direction of said filter cloth after pasage through said pair of filter cloth control rolls.

45. The solid-liquid separation device of claim 31, in which a comb means is installed in contact with the surface of said filter cloth downstream of said filter cloth wash means in the running direction of said filter cloth between said filter cloth wash means and said solid-liquid mixture supply means.

46. The solid-liquid separation device of claim 31, in which a water spray nozzle is installed on the front side of said filter cloth, downstream of said solid-liquid mixture supply means in the running direction of said filter cloth and at a position opposed to said depressurizing suction means.

47. A solid-liquid separation apparatus comprising:
an endless filtering web having a pair of longitudinal edges;
a plurality of support rollers for supporting said endless filtering web under tension;
drive means for driving said endless filtering web;
solid-liquid mixture supply means for supplying a solid-liquid mixture to an upper surface of said endless filtering web;
non-filterable material removing means positioned downstream relative to said endless filtering web with respect to a direction of travel of said endless filtering web for removing non-filterable material from said endless filtering web;
suction means positioned between said solid-liquid mixture supply means and said material removing means and below said endless filtering web for drawing liquid through said endless filter web from said solid-liquid mixture supplied to said endless filtering web at said solid-liquid mixture supply means;
wherein said suction means comprises a plurality of rollers for supporting said endless filtering web from below and a pair of spaced apart suction control sheets having inner edges each positioned along each longitudinal edge and on top of said endless filter belt for sealing said endless filter belt to said suction means, and
means for increasing a distance between the inner edges of said pair of spaced apart control sheets in the direction of travel of said endless filtering belt.

48. The apparatus according to claim 47, wherein said plurality of rollers are configured in at least two sets of paralleled spaced apart roller sets with each set supporting a longitudinal edge of said endless filtering belt.

49. The apparatus according to claim 48, wherein each set of parallel spaced apart rollers are supported at an angle with respect to an axis parallel to an axis extending along the width dimension of said endless filtering belt.

50. The apparatus according to claim 49, wherein said angle is set in the range of 0.5–5 degrees.

* * * * *